United States Patent
Erdtmann et al.

(10) Patent No.: US 7,825,381 B2
(45) Date of Patent: Nov. 2, 2010

(54) MICROMECHANICAL DEVICE FOR INFRARED SENSING

(75) Inventors: Matthew Erdtmann, Londonderry, NH (US); Jing Zhao, Winchester, MA (US); Guanghai Jin, Boxborough, MA (US)

(73) Assignee: Agiltron, Inc., Woburn, MA (US)

( * ) Notice: Subject to any disclaimer, the term of this patent is extended or adjusted under 35 U.S.C. 154(b) by 332 days.

(21) Appl. No.: 12/072,702

(22) Filed: Feb. 27, 2008

(65) Prior Publication Data

US 2009/0001271 A1    Jan. 1, 2009

Related U.S. Application Data

(60) Provisional application No. 60/929,518, filed on Jun. 29, 2007.

(51) Int. Cl.
*G01J 5/38* (2006.01)

(52) U.S. Cl. ................................. 250/339.02

(58) Field of Classification Search ........... 250/332, 250/339.1, 339.02; 374/161, 187, 191, 194, 374/205
See application file for complete search history.

(56) References Cited

U.S. PATENT DOCUMENTS

| | | | |
|---|---|---|---|
| 5,977,954 A | 11/1999 | Arimoto et al. | |
| 6,080,988 A | 6/2000 | Ishizuya et al. | |
| 6,118,124 A | 9/2000 | Thundat et al. | |
| 6,339,219 B1 | 1/2002 | Ishizuya et al. | |
| 6,469,301 B1 | 10/2002 | Suzuki et al. | |
| 6,621,083 B2 | 9/2003 | Cole | |
| 6,805,839 B2 | 10/2004 | Cunningham et al. | |
| 6,835,932 B2 | 12/2004 | Ishizuya et al. | |
| 2002/0179837 A1* | 12/2002 | Ray | 250/338.1 |
| 2005/0133721 A1* | 6/2005 | Kim et al. | 250/338.1 |
| 2009/0262778 A1* | 10/2009 | Ikushima | 374/121 |

OTHER PUBLICATIONS

T. Thundat, R. J. Warmack, G. Y. Chen, and D. P. Allison, "Thermal and ambient-induced deflections of scanning force microscope cantilevers", Appl. Phys. Lett. 64 2894-2896 (1994).

E. A. Wachter, T. Thundat, P. I. Oden, R. J. Warmack, P. G. Datskos and S. L. Sharp, "Remote optical detection using microcantilevers", Rev. Sci. Instrum. 67, 3434-3439 (1996).

R. Amantea, L. A. Goodman, F. Pantuso, D. J. Sauer, M. Varghese, T. S. Villani, and L. K. White, "Progress towards an Uncooled IR Imager with 5 mK NE?T", Proc. SPIE 3436, 647-659 (1998).

(Continued)

*Primary Examiner*—David P Porta
*Assistant Examiner*—David S Baker
(74) *Attorney, Agent, or Firm*—Michael Crilly, Esq.

(57) ABSTRACT

A micromechanical device including an improved sensing element and improved bending elements is described. Sensing elements include multi-layered structures which are thinner, lighter, and flatter than structures presently known within the related arts. Bending elements include structures which separately respond to illumination by an infrared source so as to twist a sensing element. Micromechanical pixels may be arranged to form two-dimensional arrays of infrared sensitive pixels. Arrays of micromechanical pixels are applicable to imaging devices for use within the fields of security and surveillance, firefighting, automotive safety, and industrial monitoring.

13 Claims, 22 Drawing Sheets

OTHER PUBLICATIONS

S. R. Manalis, S. C. Minne, and C. F. Quate, G. G. Yaralioglu and A. Atalar, "Two-dimensional micromechanical bimorph arrays for detection of thermal radiation", Appl. Phys. Lett. 70, 3311-3313 (1997).

J. L. Corbeil, N. V. Lavrik, S. Rajic, and P. G. Datskos, "'Self-leveling' uncooled microcantilever thermal detector", Appl. Phys. Lett. 81, 1306-1308 (2002).

T. Ishizuya, J. Suzuki, K. Akagawa, and T. Kazama, "Optically Readable Bi-Material Infrared Detector", Proc. SPIE 4369, 342-349 (2001).

T. Ishizuya, J. Suzuki, K. Akagawa, and T. Kazama, "160×120 pixels optically readable bimaterial infrared detector", Fifteenth IEEE Internat. Conf. MEMS, Las Vegas, Jan. 20-24, 2002, 578-581.

Y. Zhao, M. Mao, R. Horowitz, A. Majumdar, J. Varesi, P. Norton, and J. Kitching, "Optomechanical Uncooled Infrared Imaging System: Design, Microfabrication, and Performance", J. Microelectromech. Sys. 11, 136-146 (2002).

S. R. Hunter, R. A. Amantea, L. A. Goodman, D. B. Kharas, S. Gershtein, J. R. Matey, S. N. Perna, Y. Yu, N. Maley, and L. K. White, "High-sensitivity uncooled microcantilever infrared imaging arrays", Proc. SPIE 5074, 469-480 (2003).

P. G. Datskos, N. V. Lavrik, and S. Rajic, "Performance of uncooled microcantilever thermal detectors", Rev. Sci. Instrum. 75, 1134-1148 (2004).

J. Zhao, "High sensitivity photomechanical MW-LWIR imaging using an uncooled MEMS microcantilever array and optical readout", Proc. SPIE 5783, 506-513 (2005).

S. R. Hunter, G. Maurer, L. Jiang, G. Simelgor, "High Sensitivity Uncooled Microcantilever Infrared Imaging Arrays", Proc. SPIE 6206, 62061J (2006).

D. Grbovic, N. V. Lavrik, P. G. Datskos, D. Forrai, E. Nelson, J. Devitt, and B. McIntyre, "Uncooled infrared imaging using bimaterial microcantilever arrays", Appl. Phys. Lett. 89, 073118, (2006).

F. J. Low and A. R. Hoffman, "The Detectivity of Cryogenic Bolometers", Appl. Opt. 2, 649-650 (1963).

D. Sarid, Scanning Force Microscopy (New York: Oxford University Press, 1991), pp. 46-49.

D. Sarid, Scanning Force Microscopy (New York: Oxford University Press, 1991), p. 41.

L. N. Hadley and D. M. Dennison, "Reflection and Transmission Interference Filters", J. Opt. Soc. Amer. 37, 451-465 (1947).

C. Hilsum, "Infrared Absorption of Thin Metal Films", J. Opt. Soc. Amer. 44, 188-191 (1954).

K. Gelin and E. Wäckelgård, "Infrared emittance of $Ni_x$-$Cr_{1-x}$ alloys", J. Phys.: Condens. Matter 16, 2129-2138 (2004).

W. C. Young and R. G. Budynas, Roark's Formulas for Stress and Strain, Seventh Edition (New York: McGraw-Hill, 2002), pp. 278-280.

* cited by examiner

US 7,825,381 B2

MICROMECHANICAL DEVICE FOR INFRARED SENSING

CROSS REFERENCE TO RELATED APPLICATIONS

This application is based upon and claims priority under 35 U.S.C. §119(e) from U.S. Provisional Application No. 60/929,518 filed Jun. 29, 2007, entitled High Sensitivity Radiation Detector and Radiation Imaging Device, the contents of which are hereby incorporated in their entirety by reference thereto.

FEDERALLY SPONSORED RESEARCH AND DEVELOPMENT

None.

BACKGROUND OF THE INVENTION

1. Field of the Invention

The present invention generally relates to a micromechanical device for use within infrared imaging devices. Specifically, the invention is a micromechanical pixel including improved sensing and bending elements which separately and in combination increase the sensitivity and decrease the response time of the pixel.

2. Description of the Related Art

Infrared imaging devices enable a user to view an object via the infrared band of the spectrum, which is otherwise invisible to the human eye. Infrared imaging devices are applicable to security and surveillance, firefighting, automotive safety, and industrial monitoring because the peak thermal emission of objects in such applications is centered within the infrared region. However, the high cost of infrared imaging devices remains a challenge, thereby limiting their use.

The radiation detectors employed within imaging devices are either photon detectors or thermal detectors.

Photon detectors produce an image when incident radiation is absorbed within a sensing material via interactions with electrons bound to lattice or impurity atoms or with free electrons. An output signal, in the form of a voltage or current change, is produced by changes in the electronic energy distribution. The materials used in photon detectors, typically HgCdTe and InSb, exhibit very high quantum efficiency in the infrared band. However, photon detectors must be cryogenically cooled, thus increasing the weight, volume, and power consumption of presently known devices. Furthermore, materials which are highly quantum efficiency are notoriously difficult to process and costly. As such, imaging devices based on photon detector technologies are limited to specialized applications within the fields of national defense and astronomy.

Thermal detectors produce an image when incident radiation is absorbed by a thermally-sensitive material that alters some physical property of the material, examples including resistance or capacitance. The alteration of the physical property is typically detected by a readout integrated circuit (ROIC), which generates an output signal. Thermal detectors operate at room temperature, thus avoiding the cooling required by and complexity of photon detector devices; however, the performance of thermal detectors, as measured by their noise equivalent temperature difference (NETD), is approximately ten times less sensitive than photon detectors. The thermal sensitivity of detector materials, examples including vanadium oxide or amorphous silicon, is characteristically in the range of 2%/K to 3%/K. The bias of an interrogation pulse from a ROIC, which controls detector responsivity, is restricted to prevent self-heating of a pixel. While less costly than photon detector devices, thermal detector devices are affordable within the fields of industrial monitoring and firefighting, yet too costly for most consumer and many industrial applications.

Thermal imaging devices employing passive thermal bending, composed of bi-layer micro-cantilevers for temperature and radiation sensing and electrical, capacitive, or optical readout, are described within the related arts. For example, FIG. 1a shows an exemplary bi-layer cantilever 50 including a first layer 1 contacting and attached to a second layer 2 which are thereafter attached to a stationary support 51. The first layer 1 has a coefficient of thermal expansion different from that of the second layer 2. FIG. 1b shows the same bi-layer cantilever 50 after the first layer 1 and second layer 2 are heated by infrared radiation 52 causing the bi-layer cantilever 50 to bend. This approach to thermal imaging eliminates the monolithic integration of a pixel-level ROIC, further eliminating electronic noise and simplifying device fabrication. However, the sensitivity of presently known cantilevers is poor because of their low absorption efficiency and large mass.

An improved micromechanical thermal imaging device is described by Ishizuya et al. in U.S. Pat. Nos. 6,080,988, 6,339,219, 6,469,301, and 6,835,932. Referring now to FIGS. 2-4, a micromechanical pixel 3 is shown including a sensing element 4 disposed between and separated from a pair of bending elements 5a, 5b adjacent to a substrate 9. The sensing element 4 includes an optical absorption cavity 7 bounded by an absorber layer 8 and a reflector 6 which are spaced apart by and attached to a support post 29, as shown in FIG. 3. Each u-shaped bending element 5a, 5b is composed of a pair of bi-layer cantilevers 10a, 11a and 10b, 11b. Each paired arrangement of bi-layer cantilevers 10a, 11a and 10b, 11b is separated by a thermal isolation region 12a, 12b having a low thermal conductance. Each bi-layer cantilever 10a, 10b, 11a, 11b is composed of a high expansion layer 33 which contacts and is attached to a portion of a low expansion layer 34, as shown in FIG. 4, opposite of the substrate 9. The low expansion layer 34 of the innermost bi-layer cantilevers 11a, 11b is attached to the sides of the absorber layer 8, as represented in FIG. 2. Bending elements 5a, 5b are attached to the substrate 9 via a pair of anchor posts 13a, 13b so that a gap 49 is provided between the sensing element 4 and substrate 9 and between the bending elements 5a, 5b and substrate 9. The height of the gap 49 may be adjusted by making the length of the innermost bi-layer cantilevers 11a, 11b shorter than the outermost bi-layer cantilevers 10a, 10b.

In the absence of infrared illumination, the outermost bi-layer cantilevers 10a, 10b negate the deflection of the innermost bi-layer cantilevers 11a, 11b, thus producing a net bending of zero so as to maintain zero tilt along the sensing element 4, regardless of the change in ambient temperature. When illuminated via an infrared source, the optical absorption cavity 7 receives and converts infrared radiation into heat which is conducted into the innermost bi-layer cantilevers 11a, 11b, resulting in additional bending with respect to the outermost bi-layer cantilevers 10a, 10b and causing the sensing element 4 to tilt with respect to the plane of the substrate 9. Proper function of the device in FIG. 2 requires the micromechanical pixel 3 to be backside illuminated 32, whereby infrared radiation is transmitted through the substrate 9. High sensitivity is achieved via an efficient, yet lightweight, sensing element 4 and thin bi-layer cantilevers 10a, 10b, 11a, 11b. However, the micromechanical pixel 3 in FIG. 2 suffers from several deficiencies, which limit sensitivity and contribute to sensor noise, including a low fill factor, poor reflector flatness, and mechanical complexity.

The micromechanical pixel 3 described in FIGS. 2-4 is applicable to a variety of detectors. For example, FIG. 5 shows an exemplary optical readout device 28 described by Ishizuya et al. in U.S. Pat. No. 6,339,219 which includes an infrared lens system 15, an infrared detection array 16, a first lens system 19, an aperture plate 22, a second lens system 24, and an imager 25 arranged in the order described. Within the front end of the apparatus, rays from a source 14 pass through the infrared lens system 15 and are thereafter directed onto the infrared detection array 16. The infrared detection array 16 includes a focal plane array 17 composed of micromechanical pixels 18 which are mechanically responsive to the thermal loading induced by the infrared rays. Within the back end of the apparatus, micromechanical pixels 18 reflect the incident light 20 from a visible light source 23, one example being a light emitting diode (LED), so that the reflected light 21 passes through the first lens system 19 which compresses the reflected light 21 allowing it to pass through the pinhole 53 along the aperture plate 22. The reflected light 21 then passes through the second lens system 24 which expands the reflected light 21 so as to impinge a focal plane array 27 composed of receptor pixels 26 within the imager 25, examples being a complementary metal oxide semiconductor (CMOS) device or charged-coupled device (CCD). Thereafter, the resultant image is communicated to a video display device.

The detector in FIG. 5 employs an optical system to simultaneously measure the deflections of all micromechanical pixels 18 so as to project a visible image of spatially-varying infrared radiation directly onto a commercial-off-the-shelf visible CMOS or CCD imager. The number of receptor pixels 26 within the CMOS or CCD array is generally chosen to be more than the number of micromechanical pixels 18. In operation, an image produced by the detector in FIG. 5 is of uniform intensity over the entire array of receptor pixels 26 when no illumination is present because of the canceling effect of the paired arrangement of bi-layer cantilevers 10a, 11a and 10b, 11b, as described above for FIGS. 2-4. When illuminated by an infrared source, a sensing element 4 tilts within each micromechanical pixel 18 and deflects light away from the pinhole 53, thus projecting darker receptor pixels 26 with intensities which are proportional to the radiation level. The detector effectively converts infrared radiation into intensity change at a visible or near-infrared readout wavelength.

The micromechanical pixel 3 in FIG. 2 produces design related noise including: (1) noise caused by the radiative heat exchange between each pixel and its environment, referred to as background fluctuations; (2) noise caused by the dynamic heat exchange between each pixel and the substrate, referred to as thermal fluctuations; (3) noise from mechanical energy stored in the cantilever continuously exchanged with thermal energy, referred to as thermomechanical noise; and (4) noise caused by the random arrival rate of photons at the CMOS/CCD imager, referred to as shot noise. Since all noise sources are probabilistic, the total NETD for a micromechanical IR imager is equal to the square root of the sum of the squares of the contributing noise sources and is given by $$NETD_{TOT} = \sqrt{NETD_{BF}^2 + NETD_{TF}^2 + NETD_{TM}^2 + NETD_{SN}^2}, \quad (1)$$

where the subscripts BF, TF, TM, and SN refer to the NETD due to background fluctuations, thermal fluctuations, thermomechanical noise, and shot noise, respectively. The background fluctuation NETD is given by $$NETD_{BF} = \frac{2(4f^2+1)}{\varepsilon \tau_0 \eta dP/dT} \sqrt{\frac{2k_B \sigma B(T_D^5 + T_B^5)}{A}}, \quad (2)$$

where f is the f-number of the lens, $\epsilon$ is the pixel emissivity, $\tau_0$ is the transmission of the optics, $\eta$ is the pixel absorption efficiency, dP/dT is the differential irradiance, $k_B$ is Boltzmann's constant, $\sigma$ is the Stefan-Boltzmann constant, B is the thermal bandwidth, $T_D$ is the detector temperature, $T_B$ is the background temperature, and A is the active pixel area.

The NETD due to thermal fluctuations is given by $$NETD_{TF} = \frac{2(4f^2+1)T_D \sqrt{k_B BG}}{\tau_0 \eta A dP/dT}, \quad (3)$$

where G is the thermal conductivity.

The NETD due to thermomechanical noise is equal to $$NETD_{TM} = \frac{2(4f^2+1)G}{\eta \tau_0 A \ell dP/dT \Re} \sqrt{\frac{k_B T_D B}{kQ\omega_0}}, \quad (4)$$

where $\ell$ is the length of the bimaterial cantilever, $\Re$ is the pixel responsivity (defined as the change in pixel deflection angle per degree Kelvin), k is the stiffness of the cantilever, Q is the cantilever Q-factor, and $\omega_0$ is the cantilever resonant frequency.

The NETD due to shot noise is given by the expression $$NETD_{SN} = \frac{(4f^2+1)G}{\eta \tau_0 A dP/dT \Delta P} \sqrt{\frac{2qPB}{\Re_c}}, \quad (5)$$

where P is the visible light power received by a CMOS/CCD pixel, $\Delta P$ is the change in light power per degree Kelvin (where $\Delta P \propto \Re$), q is the elementary charge, and $\Re_c$ is the responsivity of the CMOS/CCD imager.

The dominant source contributing to the NETD in a micromechanical pixel is typically the shot noise NETD. The shot noise NETD may be lowered by increasing the responsivity $\Re$ or lowering the absolute shot noise. It may be appreciated, therefore, that there remains a need for further advancements and improvements, thus facilitating a micromechanical pixel with improved thermal sensitivity and response time.

Accordingly, what is required is a micromechanical pixel with enhanced responsivity without adversely affecting thermal properties of the pixel.

What is also required is a micromechanical pixel with enhanced thermal response time without adversely affecting the responsivity of the pixel.

SUMMARY OF THE INVENTION

An object of the present invention is to provide a micromechanical pixel with enhanced responsivity without adversely affecting thermal properties of the pixel.

Another object of the present invention is to provide a micromechanical pixel with enhanced thermal response time without adversely affecting responsivity of the pixel.

The present invention is a micromechanical device for infrared sensing with improved thermal sensitivity and thermal response time. Performance of sensing element within the micromechanical device is improved by increasing its absorption efficiency and greater control of light reflected therefrom. Performance of the bending elements within the micromechanical device is improved by increasing their sensitivity to thermal loading and isolating the sensing element and innermost bi-layer cantilever from the outermost bi-layer cantilever and substrate. The design features described below may be implemented alone or combined within a pixel, as described in the Detailed Description of the Invention.

The thermal sensitivity of a micromechanical pixel is directly related to the absorption efficiency of infrared radiation within the sensing element. The distance between the reflector and absorber layer within a sensing element is typically designed to serve as a quarter-wavelength resonant cavity to enhance absorption in a specific infrared band; however, absorption peaks in both the long-wavelength infrared band ($\lambda$=8-14 $\mu$m) and mid-wavelength infrared band ($\lambda$=3-5 $\mu$m) are possible due to harmonic effects. Long and mid wavelength bands are preferred for infrared imaging because atmospheric transmission is very high within these wavelengths. Broadband infrared anti-reflection coatings, which minimize reflections in the infrared band of interest, may be applied to both the top and bottom surfaces of the substrate to maximize absorption by the sensing element.

The responsivity of a micromechanical pixel is related to the contrast in intensity of light that passes through a pinhole aperture, or the intensity changes from bright to dark during pixel deflection, after the light is reflected by a reflector within a sensing element. As such, the reflector, typically a highly reflective metal including, but not limited to, aluminum and gold, must tightly focus the reflected light, thus requiring strict tolerance on the flatness of the reflector to prevent stray reflections or scattering. To achieve acceptable contrast, the radius of curvature of the reflector should be larger than approximately 2 cm. When the optical absorption cavity is disposed between the absorber layer and reflector, the reflector is freely suspended via an attachment post at the center of the reflector, as described above. To satisfy the flatness criterion, the reflector thickness must be greater than ~0.5 $\mu$m, thus creating a large thermal mass within the pixel which slows the thermal response time. Accordingly, the reflector thickness must be decreased to minimize the thermal response time of the pixel.

The sensitivity of a micromechanical pixel is related to the bending of bi-layer cantilevers in response to heat transferred from the absorber layer. As such, any increase in the bending sensitivity of the bi-layer cantilevers causes a corresponding increase in the reflected intensity contrast over same temperature change. In general terms, the bending sensitivity of a bi-layer cantilever is proportional to the difference in thermal expansion coefficients of the two constituent materials and inversely proportional to the cantilever thickness. The constituent materials composing a bi-layer cantilever include a metal having a high thermal expansion coefficient, typically aluminum or gold, and a dielectric having a low thermal expansion coefficient, typically $Si_3N_4$ or $SiO_2$, although other materials are possible. Accordingly, a material having a higher thermal expansion coefficient and a smaller thickness enhances the thermal sensitivity of the bending elements.

The sensitivity and response time of a micromechanical pixel is related to degree of isolation offered by the thermal isolation region between the innermost bi-layer cantilevers and the outermost bi-layer cantilevers. The ideal thermal resistance within the isolation region represents a trade-off between thermal sensitivity and thermal response time. A large thermal resistance allows heat to accumulate within the pixel, which enhances thermal sensitivity, but a small thermal resistance allows heat to be more quickly removed from the pixel so as to reduce the thermal response time. Accordingly, thermal resistance within the thermal isolation region must be tailored to optimize both sensitivity and response time.

The micromechanical pixel from FIG. 2 facilitates designs variations within the pixel structure so as to enhance the responsivity of the pixel without affecting the thermal properties thereof. Likewise, the thermal response time of the micromechanical pixel from FIG. 2 is characterized by the thermal time constant $\tau$, defined by $$\tau = \frac{C}{G} \tag{6}$$

where C is the heat capacitance of the pixel. For a micromechanical pixel, the heat capacitance is the sum of all components, especially the absorber and reflector since these have by far the largest volumes. The thermal response time of a pixel is minimized by reducing its heat capacitance, either by shrinking the pixel dimensions or choosing materials with lower specific heat capacities.

It will be appreciated by those skilled in the art that the description herein, including the disclosure provided by the illustrative claims section, is illustrative and explanatory of this invention, but is not intended to be restrictive thereof or limiting of the advantages, applications, and uses which can be achieved by this invention.

Several exemplary advantages are noteworthy. For example, the present invention is simpler to fabricate, more robust thus enabling tighter manufacturing tolerances and higher uniformity, more responsive to thermal inputs, and more optically flat than the related arts. Furthermore, the present invention achieves a higher fill factor, higher absorption efficiency, greater bending, and greater tilt than the related arts.

BRIEF DESCRIPTION OF THE DRAWINGS

The invention will now be described in more detail, by way of example only, with reference to the accompanying drawings, in which.

DETAILED DESCRIPTION OF THE INVENTION

Embodiments of the present micromechanical device 65 are described with reference to the micromechanical pixel 3 shown in FIG. 2. However, the present invention is applicable within a wide variety of micromechanical pixels that rely on mechanical deflection in response to infrared absorption to generate an optically readable signal.

Accordingly, the description of and drawing for embodiments for the present invention provided below describe and show design features of the new micromechanical device 65 without further reference to features the embodiment may have with other micromechanical devices. The embodiments described below may be fabricated via micromechanical methods and processes understood in the art.

Figure 6A:
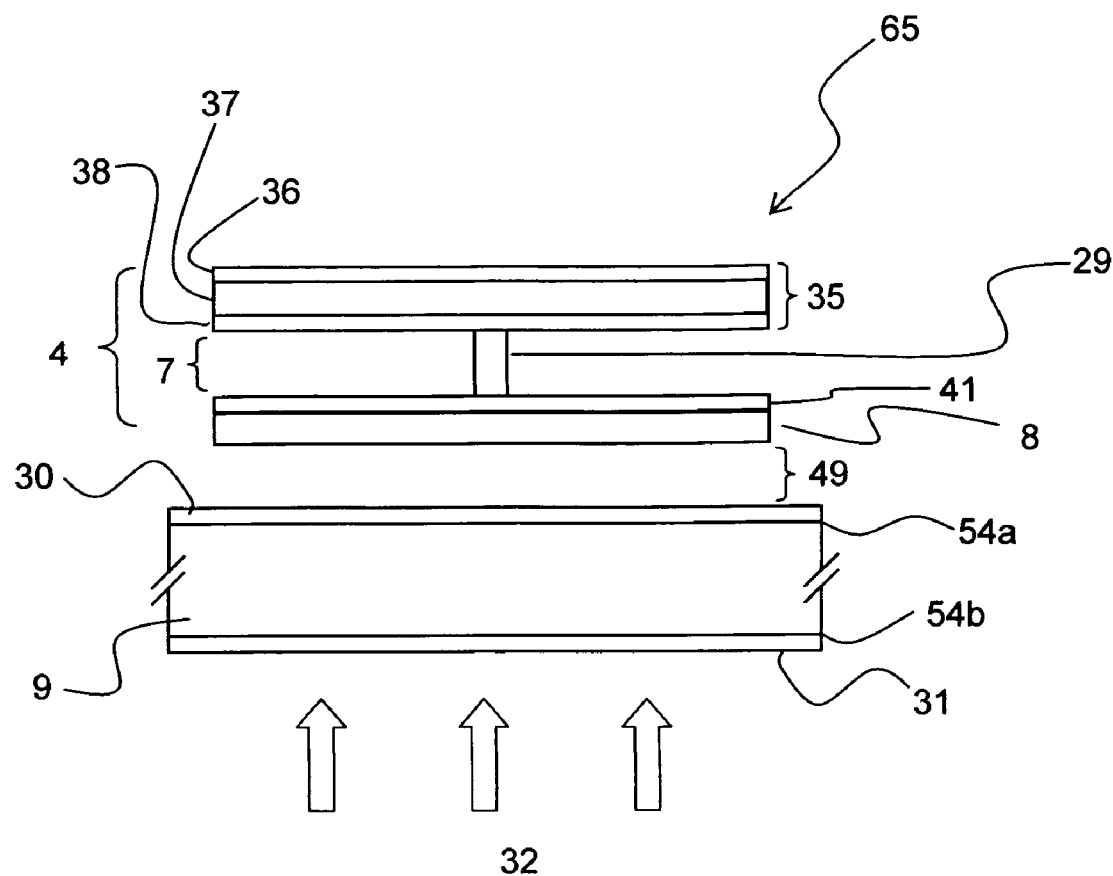
FIG. 6a is a front elevation view of an embodiment of the present invention including a multi-layer reflector.

Referring now to FIG. 6a, the sensing element 4 of a micromechanical device 65 with backside illumination 32 includes a layered reflector 35, an optical absorption cavity 7, and an absorber layer 8. The layered reflector 35 is constructed to have a multi-layered structure including a pair of outer layers 36, 38 disposed about and contacting an inner layer 37. Outer layers 36, 38 are composed of a highly reflective metal, examples including, but not limited to, aluminum, gold, silver, copper, chromium, nickel, platinum, tantalum, titanium, and alloys thereof, to accommodate optical readout. The inner layer 37 is composed of a MEMS compatible dielectric, examples including, but not limited to, $Al_2O_3$, $HfO_2$, MgO, SiC, $Si_3N_4$, $SiO_2$, TiN, and $ZrO_2$. In preferred embodiments, the layered reflector 35 should be planar in extent and have a radius of curvature greater than approximately 2 cm to ensure a flatness which minimizes stray reflections and scattering. In some embodiments, the layered reflector 35 is preferred to have a thickness not more than approximately 0.5 µm to ensure flatness and thermal response time required for most applications.

Outer layers 36, 38 and inner layer 37 are typically thin films of uniform thickness. Outer layers 36, 38 may have the same thickness so as to form a layered reflector 35 of symmetric extent or different thicknesses so as to form a layered reflector 35 of asymmetric design. Both embodiments may offset the presence of stress gradients that develop within the layered reflector 35 during fabrication of the micromechanical device 65.

Outer layers 36, 38 and inner layer 37 are layered to form a single structure via thin-film deposition methods understood in the art. The layered reflector 35 distributes stresses more evenly throughout the thickness of the structure than a single layer element, so as to prevent warp along the layered reflector 35.

The thin film outer layers 36, 38 and inner layer 37 may develop an intrinsic stress on the order of −300 MPa to +300 MPa during fabrication of the layered reflector 35 and the micromechanical device 65. This stress may be reduced via a low-temperature anneal cycle at a temperature less than 400° C. Thin films having a thickness of at least 0.5 µm were also found to mitigate stress related warp; however, it is desired to minimize film thickness to minimize the heat capacity of the micromechanical device 65.

In most embodiments, it is not possible to completely remove stress gradients within the layered reflector 35. The layered reflector 35 may be used to balance and offset stresses across the median plane of the structure to avoid stress induced warp. A layered reflector 35 with balanced internal stresses further allows the thickness thereof to be less than that of a single layer structure composed of a metal, without compromising the flatness of the element.

The layered reflector 35 shown in FIG. 6a reduces the heat capacity of a micromechanical device 65 and the thermal response thereof because the layered reflector 35 is thinner than a single layer structure and the dielectric inner layer 37 has a lower specific heat capacity than metals which typically comprise a layered reflector 35.

A partially absorbing layer 41 may be applied to the absorber layer 8 so as to maintain a high absorption efficiency within the micromechanical device 65. The partially absorbing layer 41 is a thin-film layer, which enhances absorption within the sensing element 4. In preferred embodiments, the thickness of the partially absorbing layer 41 is approximately 10 nm.

The absorption characteristics of the partially absorbing layer 41 are directly related to the sheet resistance of the composition comprising the layer. In preferred embodiments, the partially absorbing layer 41 should be an alloy with an adjustable sheet resistance, one example being NiCr, to facilitate the optimization of absorption within a specific infrared band or for a specific pixel design.

Referring again to FIG. 6a, the substrate 9 may in some embodiments include an anti-reflection coatings 30, 31, examples including, but not limited to, IRX/Ge/YF$_3$, IRX/Ge/BaF$_2$, and IRX/Ge/ZnS which are transmissive of the infrared regions of interest, applied to the surfaces 54a, 54b along the top and/or bottom of the substrate 9. Anti-reflection coatings 30, 31 are applied via deposition methods understood within the art. The substrate 9 is likewise transmissive of infrared wavelengths of interest.

Figure 6B:
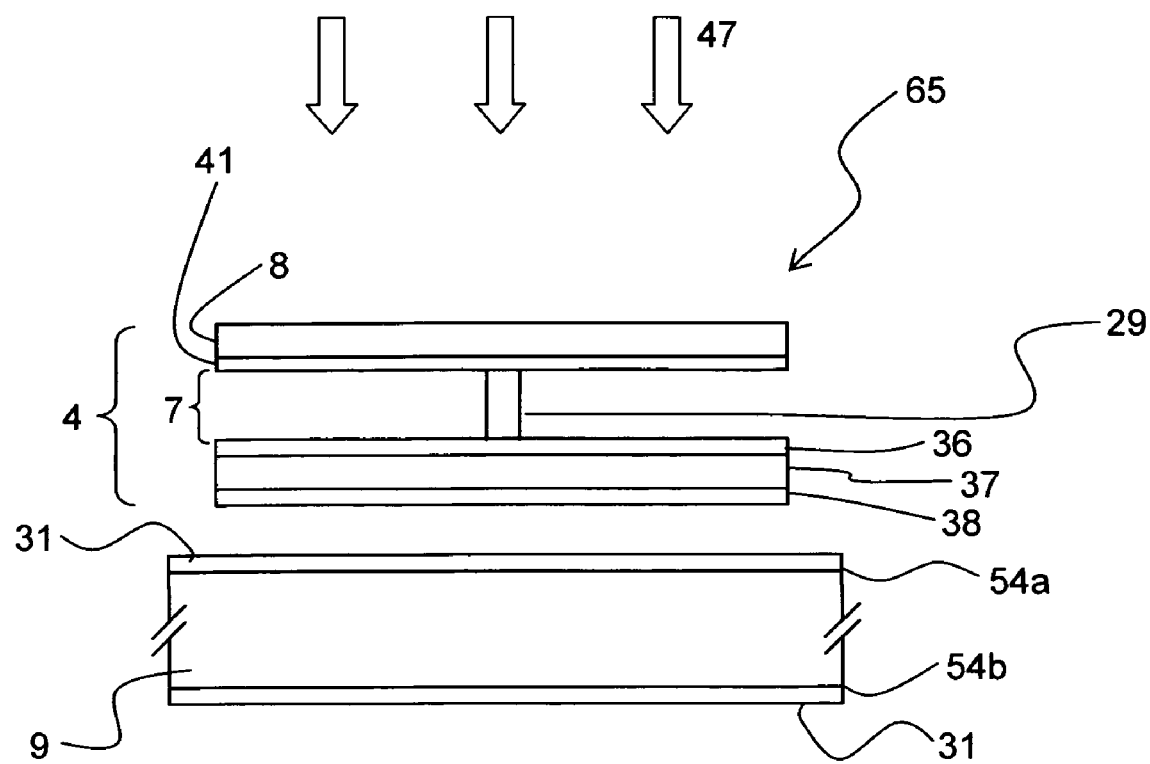
FIG. 6b is a front elevation view of an alternate embodiment of the device in FIG. 6a wherein the sensing element is front illuminated by inverting the order of the absorber and reflector and optical readout occurs through the substrate.

Referring now to FIG. 6b, the micromechanical device 65 is shown so as to facilitate use with applications having frontside illumination 47. In this embodiment, absorption and reflection losses caused by the transmission of infrared radiation through the substrate 9 are avoided, thus improving the absorption of infrared light by the micromechanical device 65 and facilitating a higher responsivity. Frontside illumination 47 heats the sensing element 4 via infrared radiation. Compared to the sensing element 4 in FIG. 6a, the sensing element 4 in FIG. 6b is inverted so that the infrared radiation reaches the absorber layer 8 first. The optical absorption cavity 7 is situated between the partially absorbing layer 41 and reflector 35, which may consist of only a single highly reflective metal layer or, as shown in FIG. 6b, a layered reflector 35.

Substrate 9 materials include, but are not limited to, silicon and glass. Optical readout now occurs through the substrate 9, necessitating the substrate 9 to be transmissive in the visible or near-infrared region. To maximize infrared absorption in the sensing element 4, thin film coatings 30, 31 composed of materials that are transmissive in the visible or near infrared region and reflective in the MWIR and/or LWIR regions are applied to both surfaces 54a, 54b of the substrate 9; however, the thin film coatings 30, 31 should allow for optical readout. One exemplary thin film coating 30, 31 is indium tin oxide (ITO). Anti-reflection coatings designed for the visible or near-infrared regions may also be applied to both surfaces 54a, 54b to increase transmission of the readout light.

Figure 7:
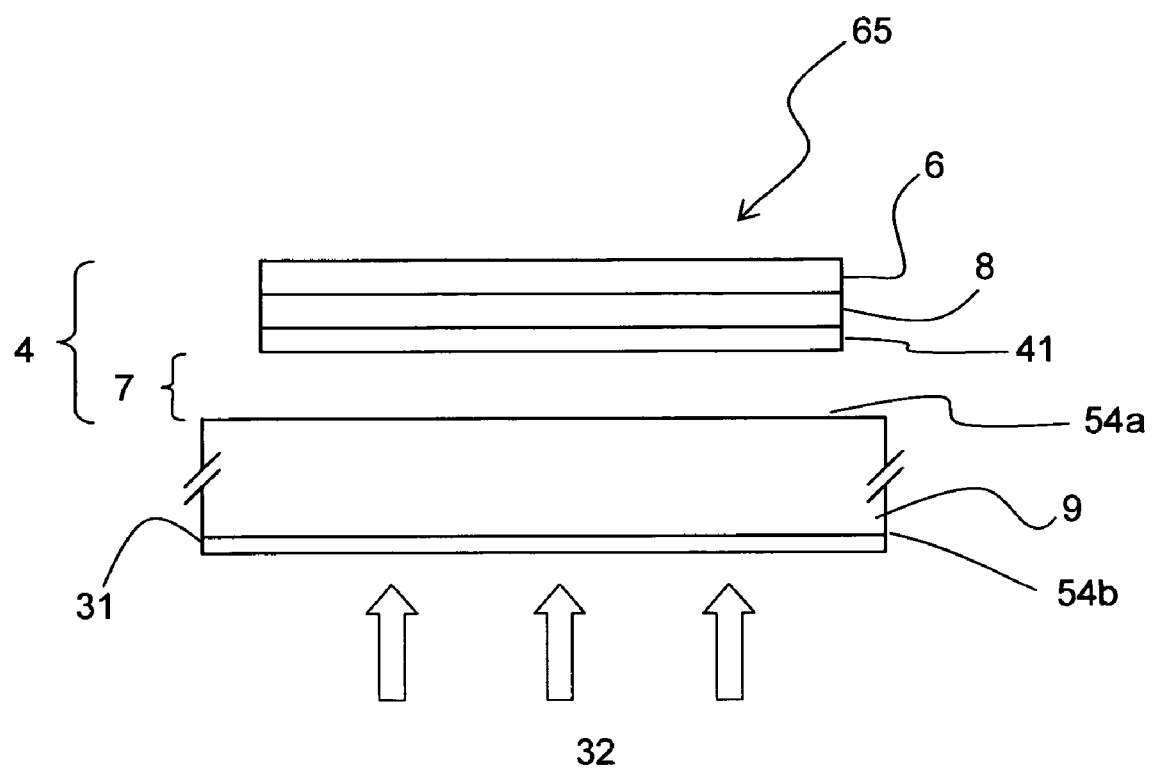
FIG. 7 is a front elevation view of an embodiment of the present invention showing reflector, absorber, and partially absorbing layers contacting in a layered arrangement.

Referring now to FIG. 7, the sensing element 4 of a micromechanical device 65 includes a reflector 6, an absorber layer 8, and a partially absorbing layer 41 arranged and contacting in the order described. In this embodiment, the thickness of the reflector 6 may be reduced to decrease the thermal response time of the sensing element 4 without compromising the flatness thereof. The optical absorption cavity 7 is now situated between the partially absorbing layer 41 and substrate 9.

The reflector 6 is desired to have good reflectivity and low absorptivity in the visible or near-infrared regions to facilitate optical readout. Reflector 6 materials may include, but are not limited to, aluminum, gold, silver, copper, chromium, nickel, platinum, tantalum, titanium, and alloys thereof. The thickness of the reflector 6 may be approximately 0.2 µm because it is now supported by the absorber layer 8. In preferred embodiments, the thickness of the reflector 6 should be less than that of the absorber layer 8, so as to minimize thermally-induced bending within the sensing element 4.

Referring again to FIG. 7, backside illumination 32 of the micromechanical device 65 may in some embodiments require an anti-reflection coating 31 along the surface 54b of the substrate 9 closest to the infrared source to maximize transmission. The anti-reflection coating 31 should be transmissive of the infrared regions of interest. It is not necessary to apply an anti-reflection coating to the other surface 54a along the substrate 9, because higher reflectivity is desired within the optical absorption cavity 7.

Figure 10:
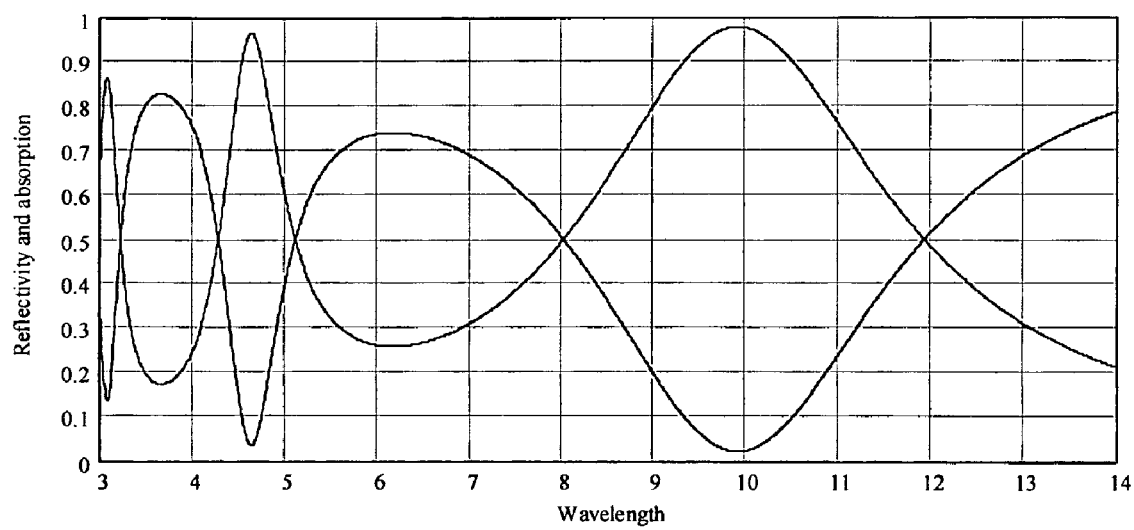
FIG. 10 is an exemplary absorption spectrum plot for one exemplary implementation of the device in FIG. 7.

Referring now to FIG. 10, the absorption spectrum is shown for an exemplary micromechanical device 65 including the structure in FIG. 7. The micromechanical device 65 is comprised of a sensing element 4 including a partially absorbing layer 41 composed of NiCr, an absorber layer 8 composed of SiN, a reflector 6 composed of NiCr/Au, a substrate 9 composed of silicon, and an anti-reflection coating 31 composed of IRX/Ge/ZnS. The optical absorption cavity 7 is a gap or space dimensioned to form a half-wavelength resonance cavity. FIG. 10 indicates that absorption is achievable within both MWIR and LWIR bands via a single pixel design.

Figure 8:
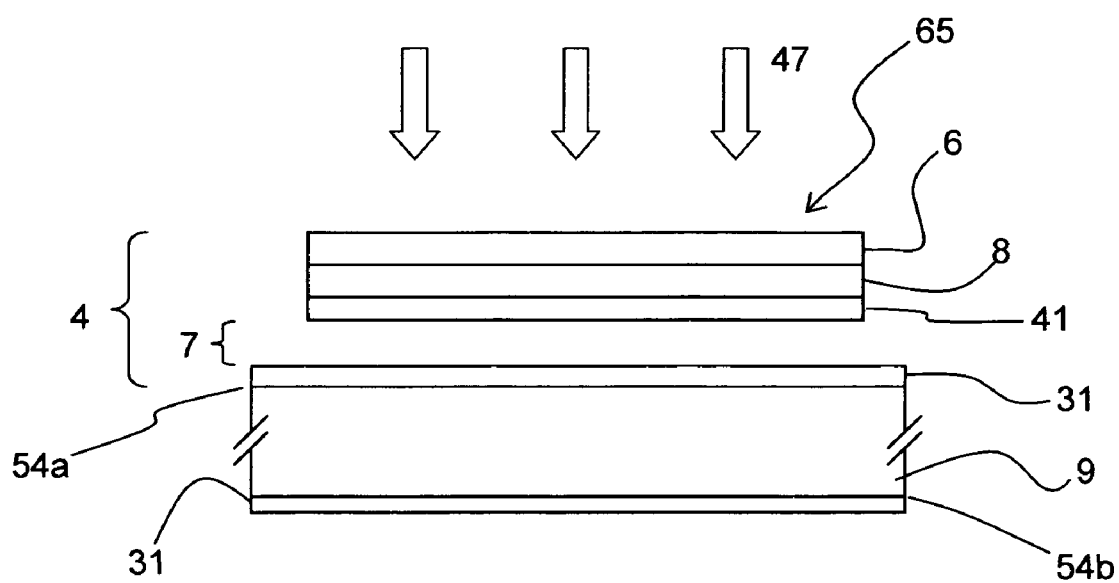
FIG. 8 is a front elevation view of an alternate embodiment of the device in FIG. 7 wherein the sensing element is front illuminated and having a reflective coating applied to the top surface of the substrate opposite of the partially absorbing layer so that optical readout occurs through the substrate.

Referring now to FIG. 8, the sensing element 4 of the micromechanical device 65 is shown where the absorber layer 8 is in contact with the reflector 6. In this embodiment, the optical absorption cavity 7 is situated between the partially absorbing layer 41 and substrate 9. Frontside illumination 47 heats the sensing element 4 via infrared radiation. The combination of absorber layer 8 and reflector 6 into a single stack facilitates the 2 cm flatness requirement via a lower total thickness than otherwise achievable when the layers are separated. The lower heat capacity resulting from the lower material volume within the combined stack facilitates a quicker response time.

The reflector 6 must transmit medium-wavelength infrared (MWIR) and long-wavelength infrared (LWIR) and reflect in the visible or near-infrared regions. Exemplary materials comprising the reflector 6 include $Yb_2O_3$, $Y_2O_3$, $Zr_2O_3$, and $Hf_2O_3$. The absorber layer 8 may be composed of $Al_2O_3$, $HfO_2$, MgO, SiC, $Si_3N_4$, $SiO_2$, TiN, and $ZrO_2$. The partially absorbing layer 41 may be composed of NiCr to enhance absorption. In some embodiments, the reflector 6 may be eliminated through careful design of the absorber layer 8 and partially absorbing layer 41.

Figure 9A:
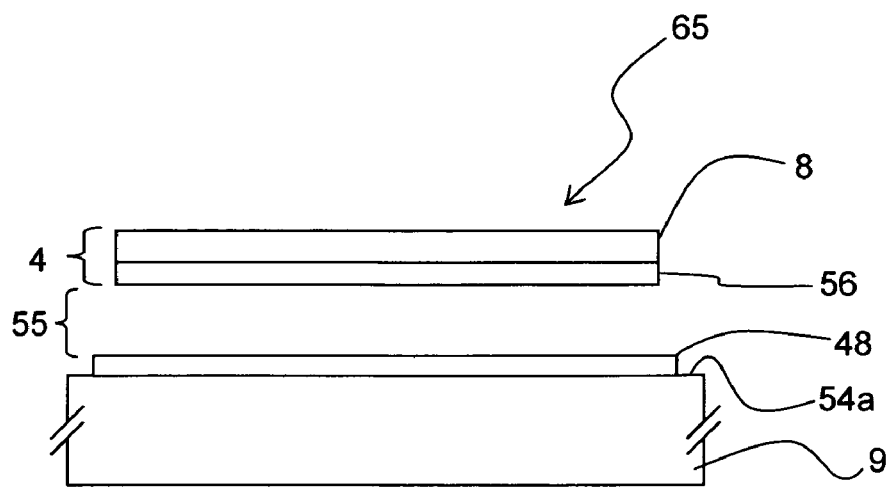
FIG. 9a is a front elevation view of an alternate embodiment of the present invention wherein a readout circuit with capacitive sensor contacts the substrate opposite of an absorbing layer so as to allow the capacitive sensor to measure the gap between substrate and sensing element.

Referring now to FIG. 9a, the micromechanical device 65 is shown so as to facilitate use with applications having capacitive readout to detect the tilt within a sensing element 4, rather than the optical readout as described for embodiments in FIGS. 6a, 6b, 7, and 8. The sensing element 4 contains a conductive layer 56 which contacts and is attached to an absorber layer 8. The absorber layer 8 may be composed of materials including, but not limited to, $Al_2O_3$, $HfO_2$, MgO, SiC, $Si_3N_4$, $SiO_2$, TiN, and $ZrO_2$. The micromechanical device 65 also contains a capacitive sensor with readout circuit 48 which resides on along one surface 54a of the substrate 9. The conductive layer 56 and capacitive sensor with readout circuit 48 facilitate measurements of the gap 55 between the substrate 9 and sensing element 4, which is dependent on the intensity of infrared radiation absorbed by the pixel.

Figure 9B:
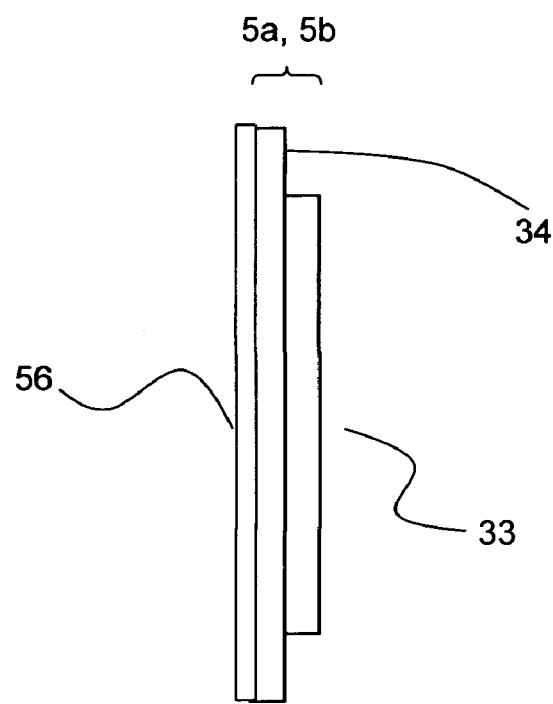
FIG. 9b is a side elevation view of a bending element showing an electrically conductive layer with low thermal conductance applied to the low expansion layer.

The conductive layer 56 serves as one plate of a parallel-plate capacitor. The conductive layer 56 may be composed of a metal or metal alloy which is electrically conductive or a partially-absorbing metal or alloy, examples including, but not limited to, NiCr, to enhance absorption. The second plate of the parallel-plate capacitor is located within the capacitive sensor with readout circuit 48 attached to the substrate 9 using thin-film deposition methods understood in the art. The second plate may be composed of a metal or metal alloy. In this embodiment, the bending elements 5a, 5b also contain an electrically conductive layer 56 along its length, as represented in FIG. 9b, to electrically connect the sensing element 4 to the readout circuit disposed along the substrate 9. Since the thermal isolation region 12a, 12b along a bending element 5a, 5b must have low thermal conductance, the conductive layer 56 must also have low thermal conductance. Exemplary compositions for the conductive layer 56 include indium tin oxide and titanium nitride.

The sensing element 4 absorbs infrared radiation deflecting the sensing element 4 and decreasing the distance between the two parallel plates, thereby altering the capacitance in the parallel-plate capacitor. The capacitive sensor with readout circuit 48 measures the resultant gap 55. In this embodiment, the bi-layer cantilevers 10a, 10b, 11a, 11b provide automatic compensation to changes in ambient temperature. The present embodiment eliminates shot noise which is common to optical readout devices.

Figure 11:
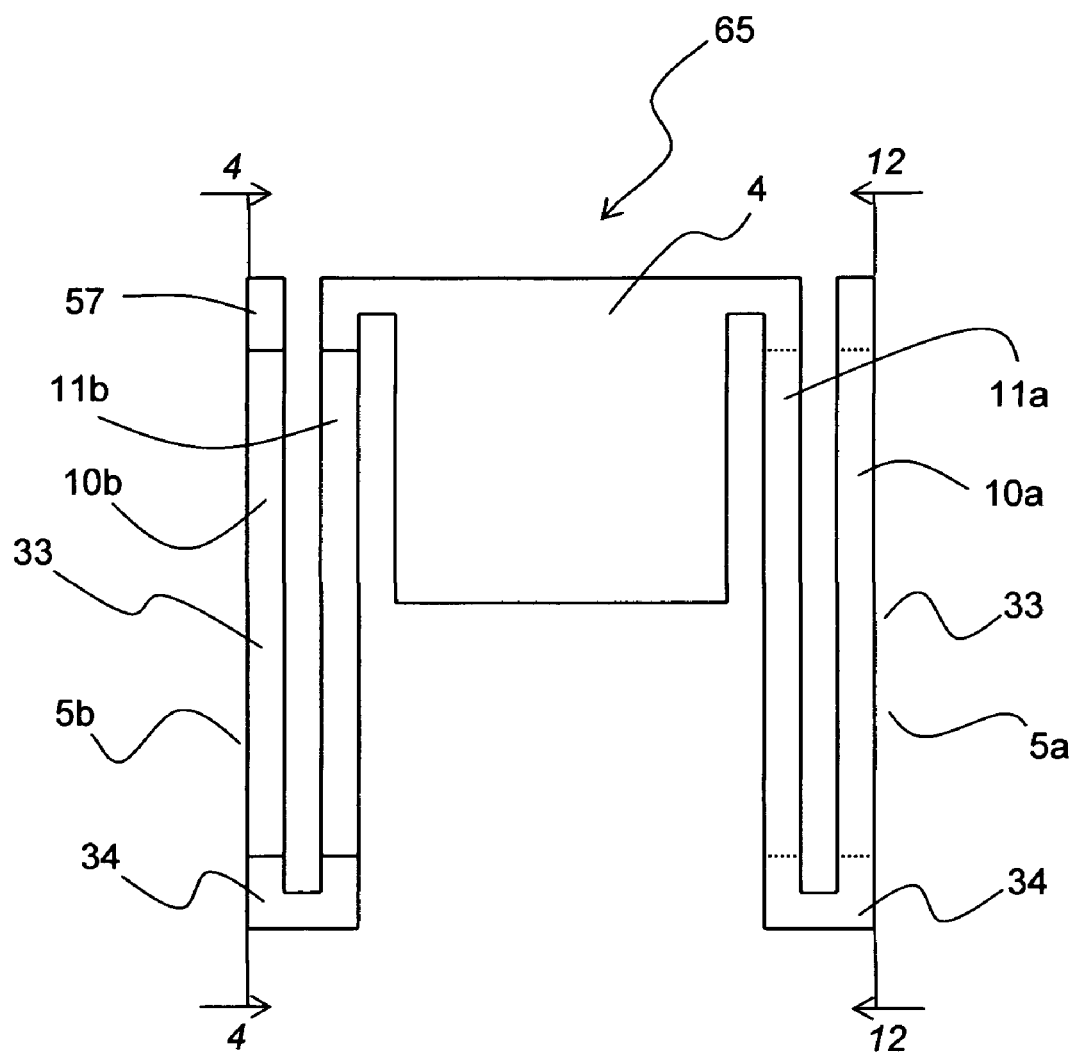
FIG. 11 is a top elevation view of an embodiment of the present invention including bending elements arranged in an opposing fashion so that they deflect in opposed directions.

Referring now to FIG. 11, a micromechanical device 65 is shown whereby the bending elements 5a, 5b are disposed so as to be separately responsive such that the left bending element 5b deflects towards the substrate 9 and the right bending element 5a deflects away from the substrate 9. It is likewise possible for the order of deflection noted above to be reversed. Unlike the micromechanical pixel 3 shown in FIG. 2, which has the sensing element 4 tilt in the direction parallel to the bi-layer cantilevers 10a, 10b, 11a, 11b, the present embodiment enables the sensing element 4 to twist in the direction perpendicular to the bi-layer cantilevers 10a, 10b, 11a, 11b. The resultant device enhances the overall tilt angle of the sensing element 4, thus improving thermal sensitivity. The sensing elements 4 and substrate 9 described herein are applicable to this embodiment.

Figure 4:
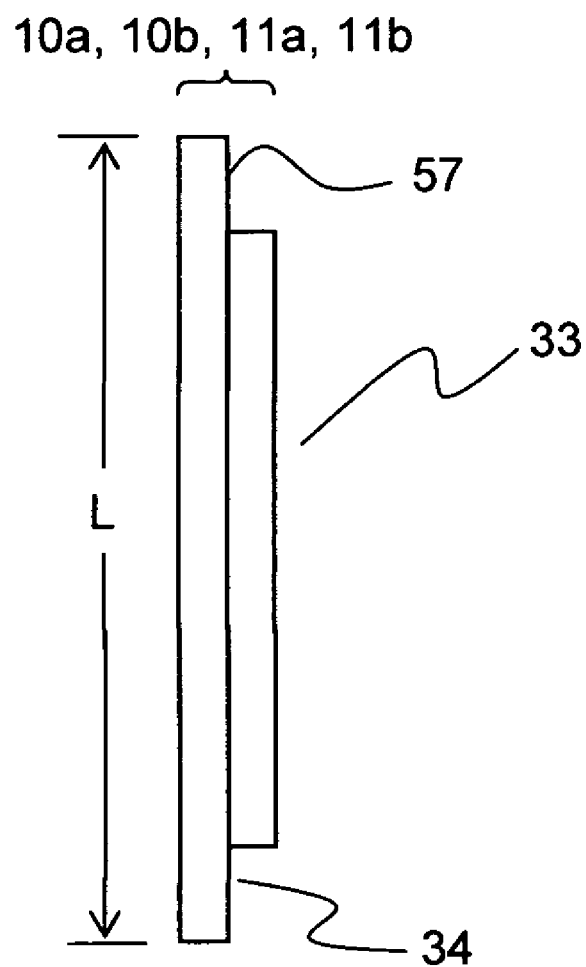
FIG. 4 is a side elevation view of a bi-layer micro-cantilever for the micromechanical pixel in FIG. 2 showing arrangement of layers with high and low thermal expansion coefficients.
Figure 5:
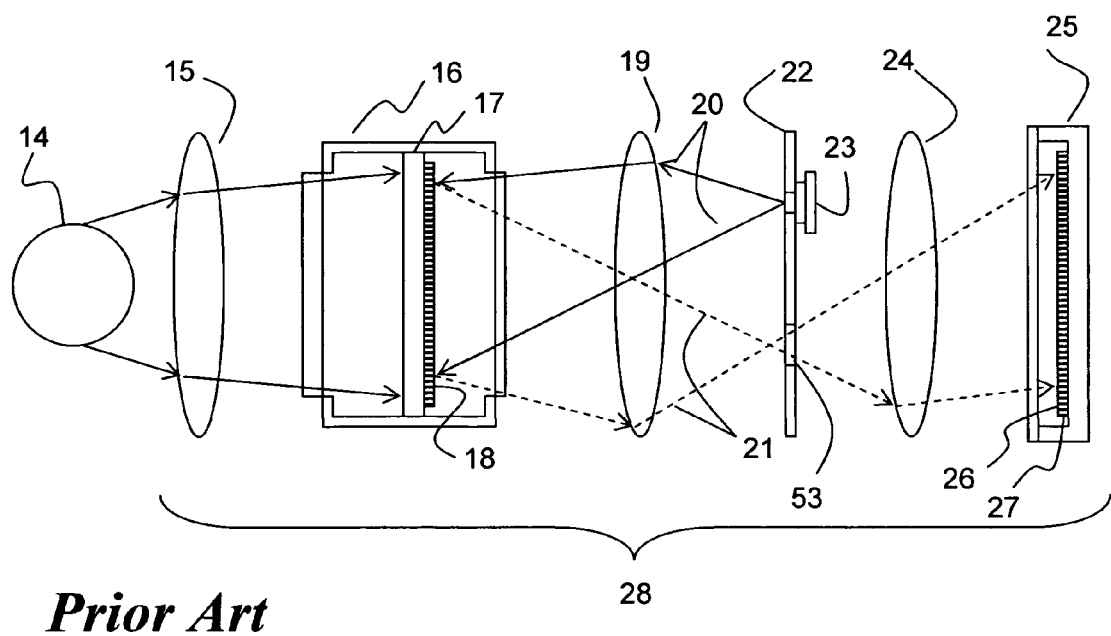
FIG. 5 is a schematic diagram showing an exemplary imaging device including an array of micro-cantilever pixels within an optical readout camera and an array of receptor pixels within an imager.
Figure 12:
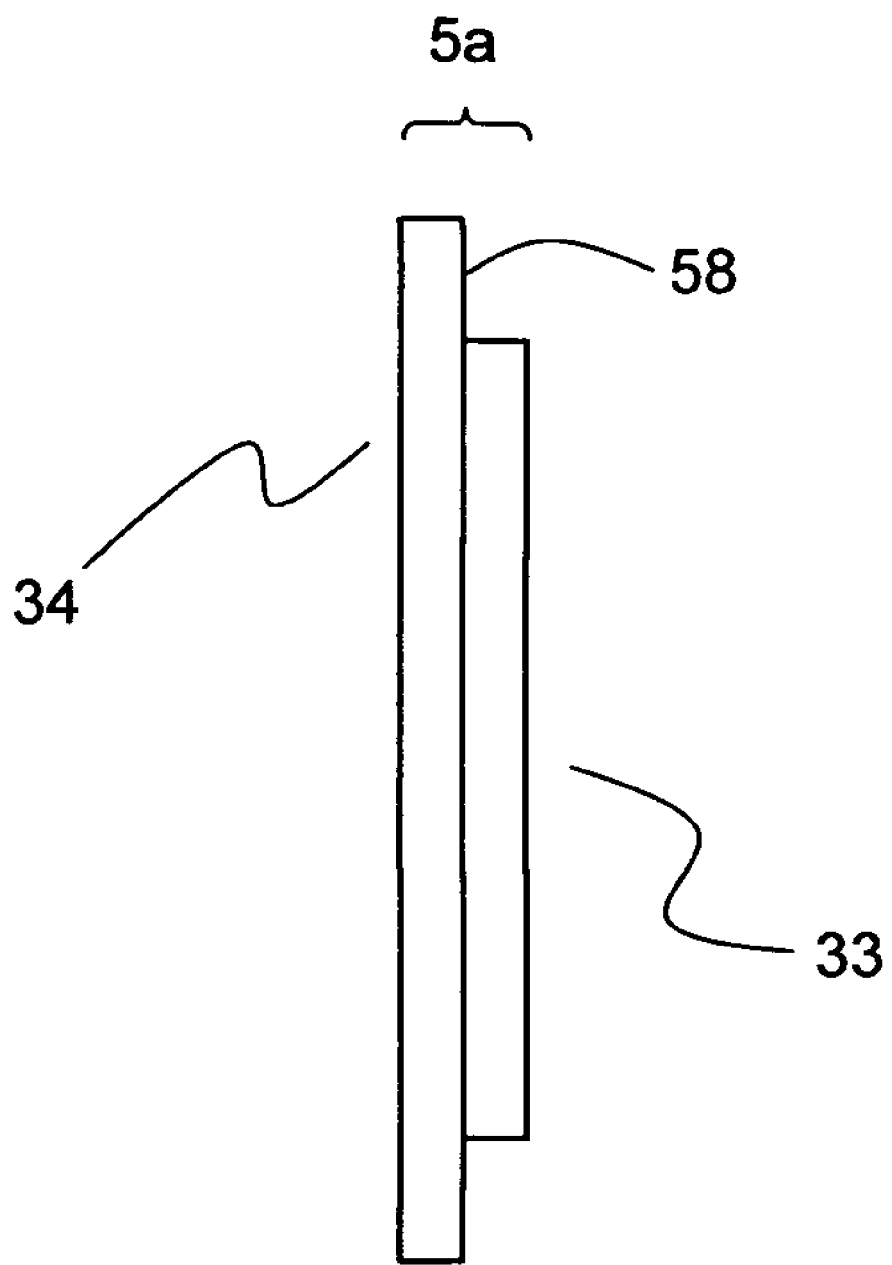
FIG. 12 is a side elevation view of one bending element showing arrangement of the low and high expansion layers so that the high expansion layer is disposed opposite of the substrate.

Opposed functionality of the bending elements 5a, 5b is achieved by placing the high expansion layers 33 along the top surface 57 of the low expansion layers 34 along the left bending element 5b, as represented in FIG. 4, and the high expansion layers 33 along the bottom surface 58 of the low expansion layers 34 along the right bending element 5a, as represented in FIG. 12. The bending elements 5a, 5b contact and are attached to the sensing element 4 at one end thereof in a symmetric fashion.

Opposed functionality of the bending elements 5a, 5b may also be achieved by placing the high expansion layer 33 along the top surface 57 of the low expansion layer 34 for half of its length and along the bottom surface 58 of the low expansion layer 34 for the other half of its length. The bending elements 5a, 5b deflect in an s-shape in this configuration. This configuration prevents the bending elements 5a, 5b from contacting the substrate that may occur if they were to deflect downward.

The responsivity of a micromechanical device 65 is proportional to the tilt angle of the sensing element 4, which is equal to the difference between the angles of tilt along the outer bi-layer cantilevers 10a, 10b at ambient temperature and the inner bi-layer cantilevers 11a, 11b heated by incident infrared radiation. The sensing element 4 tilts at the same angle as the inner bi-layer cantilevers 11a, 11b, or $\Delta\theta$, when the bending elements 5a, 5b are mutually responsive so as to deflect in the same direction, as provided by the device in FIG. 2. Assuming a small deflection angle, the change in angle, $\Delta\theta$, of a bi-layer cantilever 10a, 10b, 11a, 11b in response to a change above ambient temperature $\Delta T$ is given by the expression $$\Delta\theta = \frac{3\ell_b}{t_1+t_2}\left[\frac{\left(1+\frac{t_1}{t_2}\right)^2}{3\left(1+\frac{t_1}{t_2}\right)^2+\left(1+\frac{t_1}{t_2}\frac{E_1}{E_2}\right)\left(\frac{t_1^2}{t_2^2}+\frac{t_2}{t_1}\frac{E_2}{E_1}\right)}\right](\alpha_1-\alpha_2)\Delta T, \quad (7)$$

where $l_b$ is the length of the bi-layer cantilevers 10a, 10b, 11a, 11b and $t_1$ and $t_2$ are the thicknesses, $E_1$ and $E_2$ are the Young's modulus, and $\alpha_1$ and $\alpha_2$ are the thermal expansion coefficients of the two materials comprising the cantilevers.

Referring again to FIG. 11, the sensing element 4 twists at an angle determined by the out-of-plane deflection of the opposed bending elements 5a, 5b. Assuming a small angle, the out-of-plane deflection of the bending elements 5a, 5b is $l_b \Delta\theta$ and the angle of twist is equal to $2l_b \Delta\theta/w$, where w is the width between the bending elements 5a, 5b or the width of the sensing element 4, and the factor of 2 results from the opposed deflections of the bending elements 5a, 5b. The degree of enhancement achievable by bending elements 5a, 5b with opposed functionality is approximately $2l_b/w$, corresponding to a 2 to 4 times increase in the responsivity of a typical micromechanical pixel 3.

Figure 13:
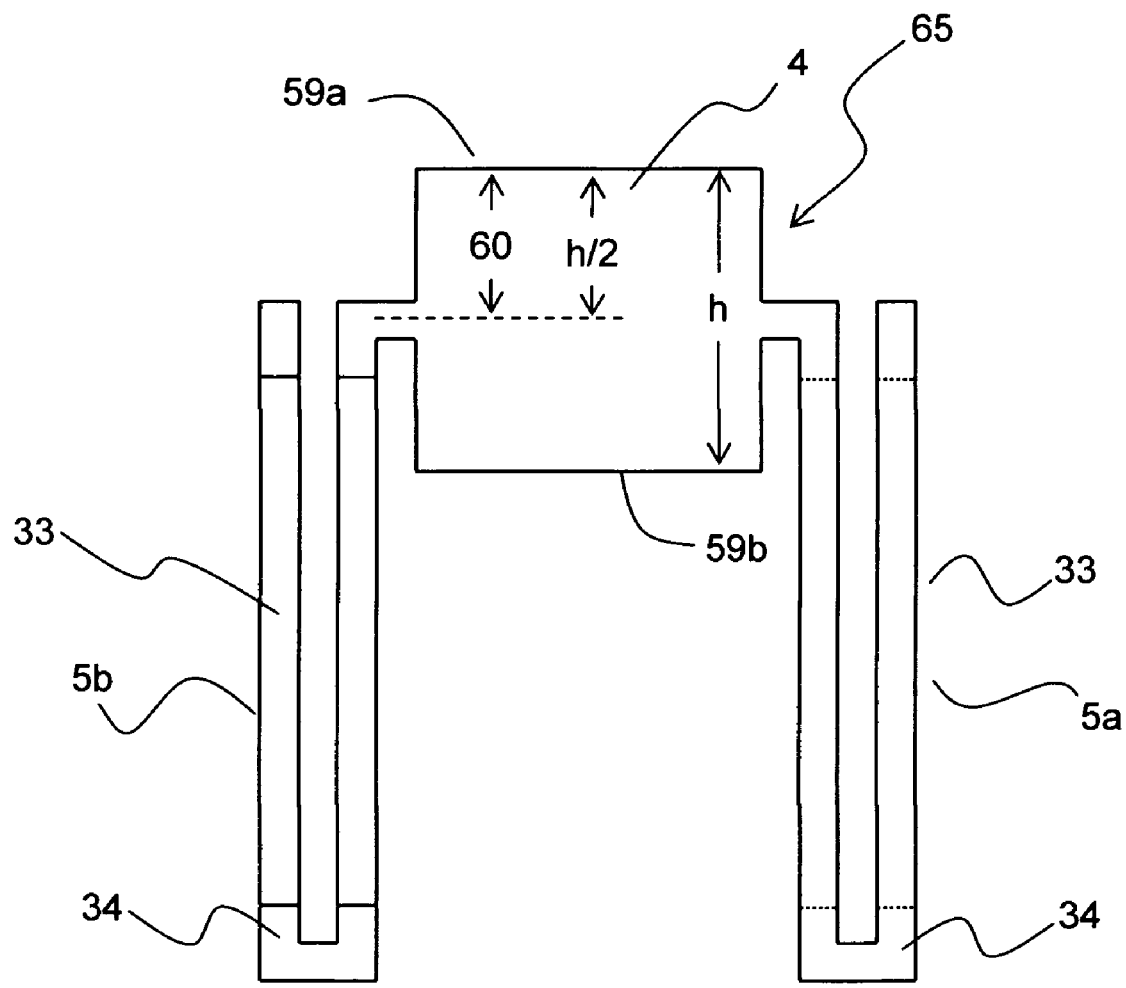
FIG. 13 is a top elevation view of an alternate embodiment of the device in FIG. 11 wherein the bending elements are joined to the sensing element at its center.

Referring now to FIG. 13, a micromechanical device 65 is shown wherein the bending elements 5a, 5b from FIG. 12 are arranged to contact and attach to the sensing element 4 at an offset 60 from an edge 59a along the sensing element 4. In preferred embodiments, the offset 60 should be approximately one-half of the total height (h) of the sensing element 4, although other arrangements are possible. This embodiment increases the rigidity of the micromechanical device 65, however, the bending moment between bending elements 5a, 5b and sensing element 4 is reduced. The sensing elements 4 and substrates 9 described herein are applicable to this embodiment.

The twisting of the sensing element 4, as described above, produces torsion within the bending elements 5a, 5b. The degree of responsivity enhancement may be limited by the torsional rigidity of the bending elements 5a, 5b. In some embodiments, it might be desirous to reduce the thickness of the contact structure between each bending element 5a, 5b and the sensing element 4 so as to further reduce the torsional rigidity. In other embodiments, it might be advantageous to include a spring-like or hinge-like connection between each bending element 5a, 5b and sensing element 4. In yet other embodiments, it could be advantageous to have the contact be composed of a material having a low Young's modulus.

Figure 14:
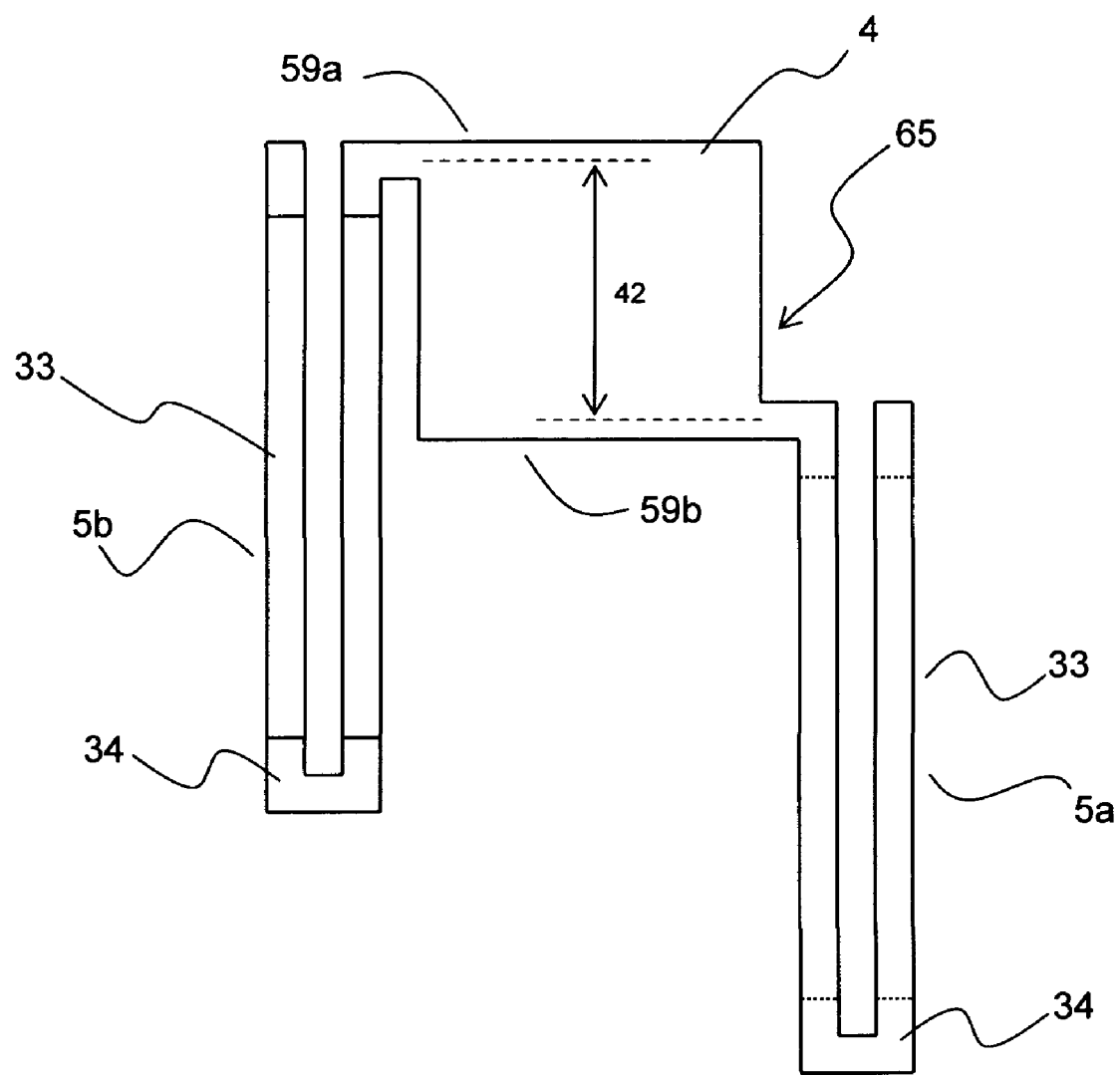
FIG. 14 is a top elevation view of an alternate embodiment of the device from FIG. 11 wherein the bending elements are joined to the sensing element in an offset arrangement.

Referring now to FIG. 14, a micromechanical device 65 is shown wherein the bending elements 5a, 5b from FIG. 12 are arranged to contact and attach to the sensing element 4 in an asymmetric arrangement at an offset 42 along the sensing element 4. While FIG. 14 shows the left bending element 5b aligned with the top edge 59a and the right bending element 5a aligned with the bottom edge 59b, other arrangements are possible whereby one or both bending elements 5a, 5b are located along the sensing element 4 at a distance from the respective edge 59a, 59b. The sensing elements 4 and substrates 9 described herein are applicable to this embodiment.

Figure 1A:
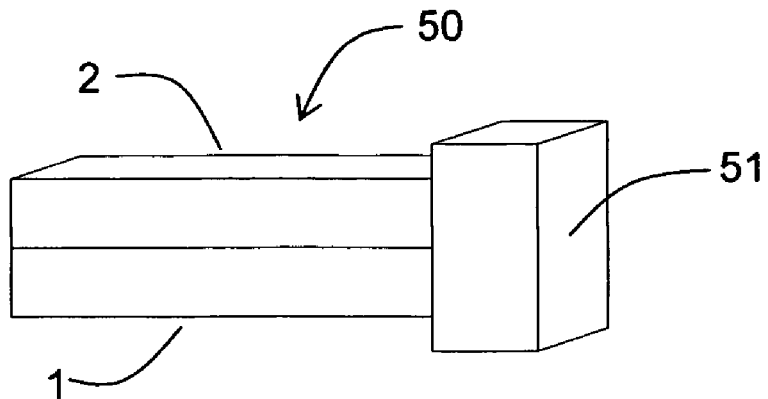
FIG. 1a is perspective view of an exemplary bi-layer cantilever element composed of a layer having a high thermal expansion coefficient and a layer having a low thermal expansion coefficient.
Figure 1B:
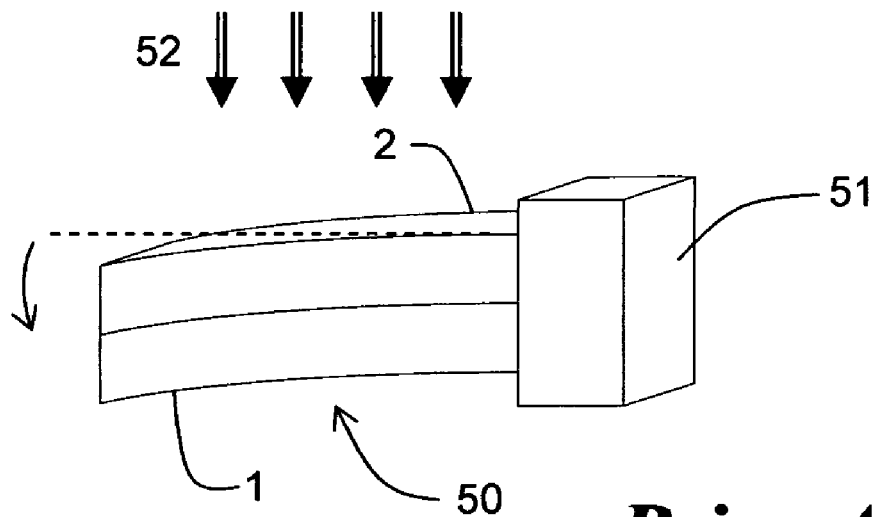
FIG. 1b is a perspective view of the bi-layer cantilever element from FIG. 1a showing resultant bending after the cantilever is heated by infrared radiation.
Figure 2:
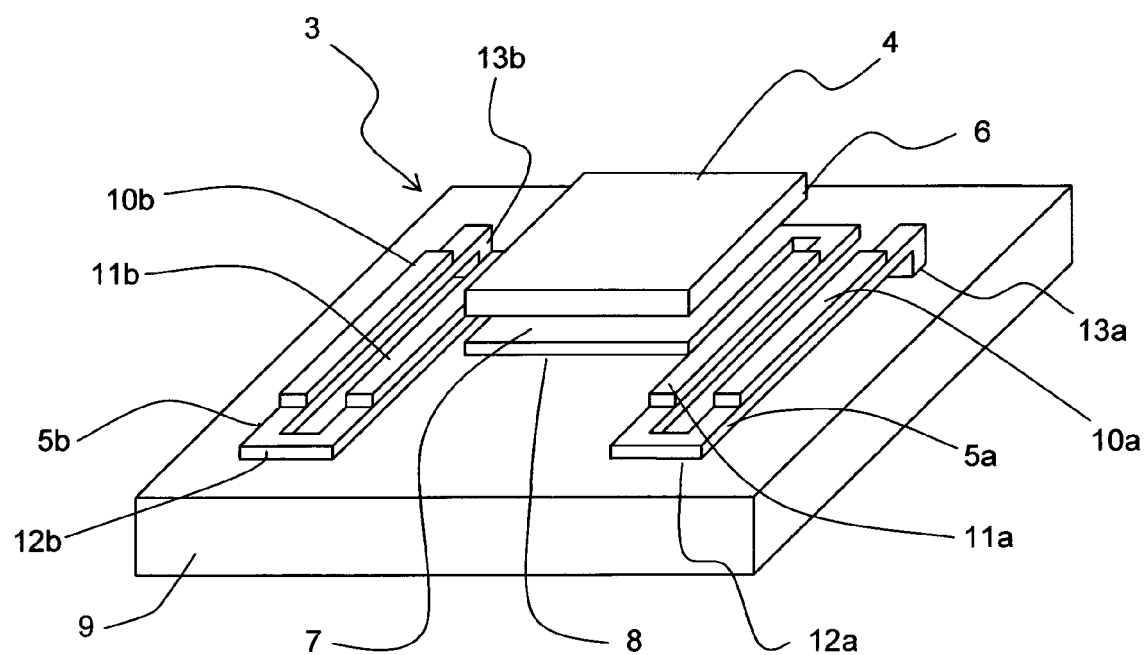
FIG. 2 is a perspective view of a micromechanical pixel including a sensing element, a pair of bi-layer micro-cantilevers, and a substrate.
Figure 3:
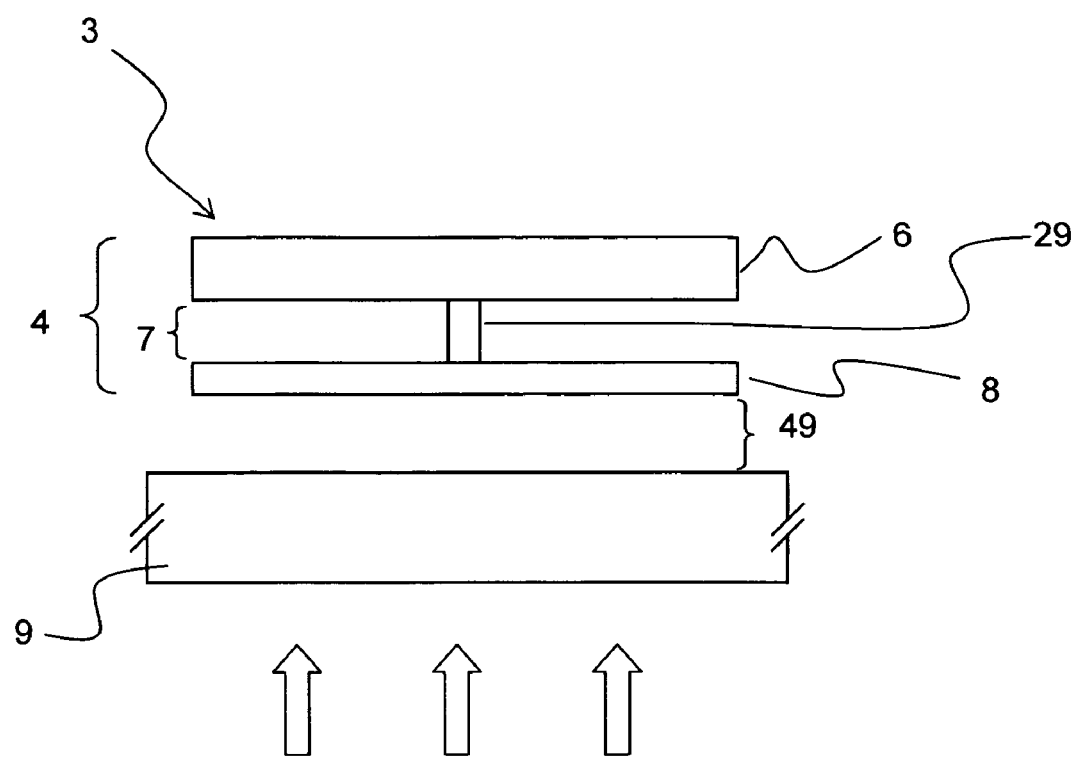
FIG. 3 is a front elevation view of the micromechanical pixel in FIG. 2 showing arrangement of sensing element and substrate.

In this embodiment, the degree of tilt is increased over the device shown in FIG. 2 by approximately $2l_b/\sqrt{w^2+l^2_p}$, where $l_p$ is the length of the sensing element 4. Accordingly, the responsivity of the present embodiment is 1.5 to 3 times greater than that of a micromechanical pixel 3 shown in FIG. 2.

Figure 15:
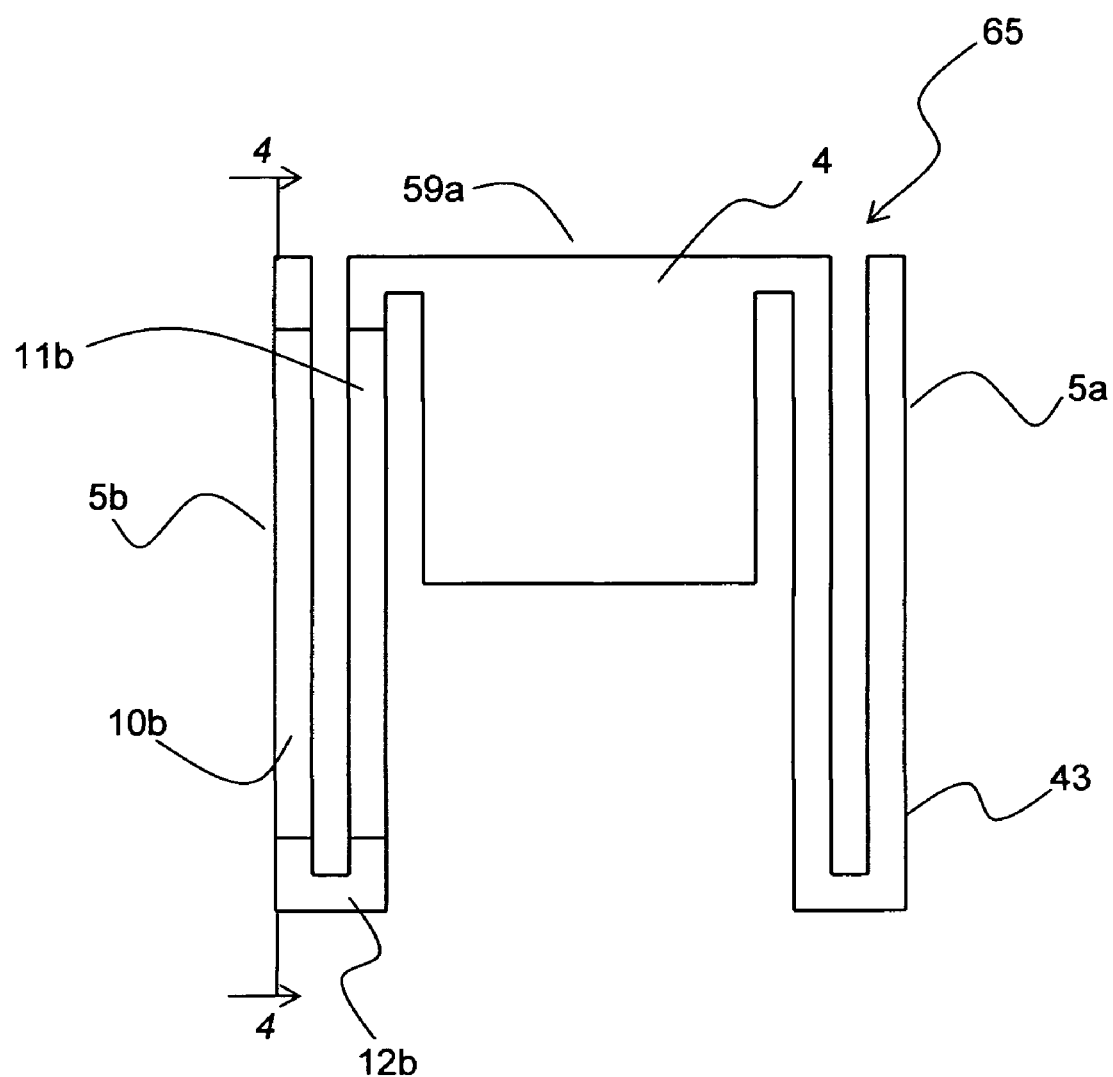
FIG. 15 is a top elevation view of an alternate embodiment of the device in FIG. 11 wherein one bending element is a bi-layered element and the other bending element is a single layer element.

Referring now to FIG. 15, a micromechanical device 65 is shown wherein the right bending element 5b includes a pair of bi-layer cantilevers 10b, 11b and thermal isolation region 12b, as described above, and the left bending element 5a is comprised of a low expansion layer 43 composed of a single material or composition. In this embodiment, the bending element 5b deflects towards or away from the substrate 9 enabling the sensing element 4 to tilt in the direction parallel to the bending elements 5a, 5b and to twist in the direction perpendicular to the bending elements 5a, 5b. It is likewise possible for the arrangement of deflecting and non-deflecting members to be reversed. The sensing elements 4 and substrate 9 described herein are applicable to this embodiment.

In this embodiment, the degree of tilt is increased over the device shown in FIG. 2 by approximately $l_b/w$, and approximately one-half that for the device in FIG. 11.

Figure 16:
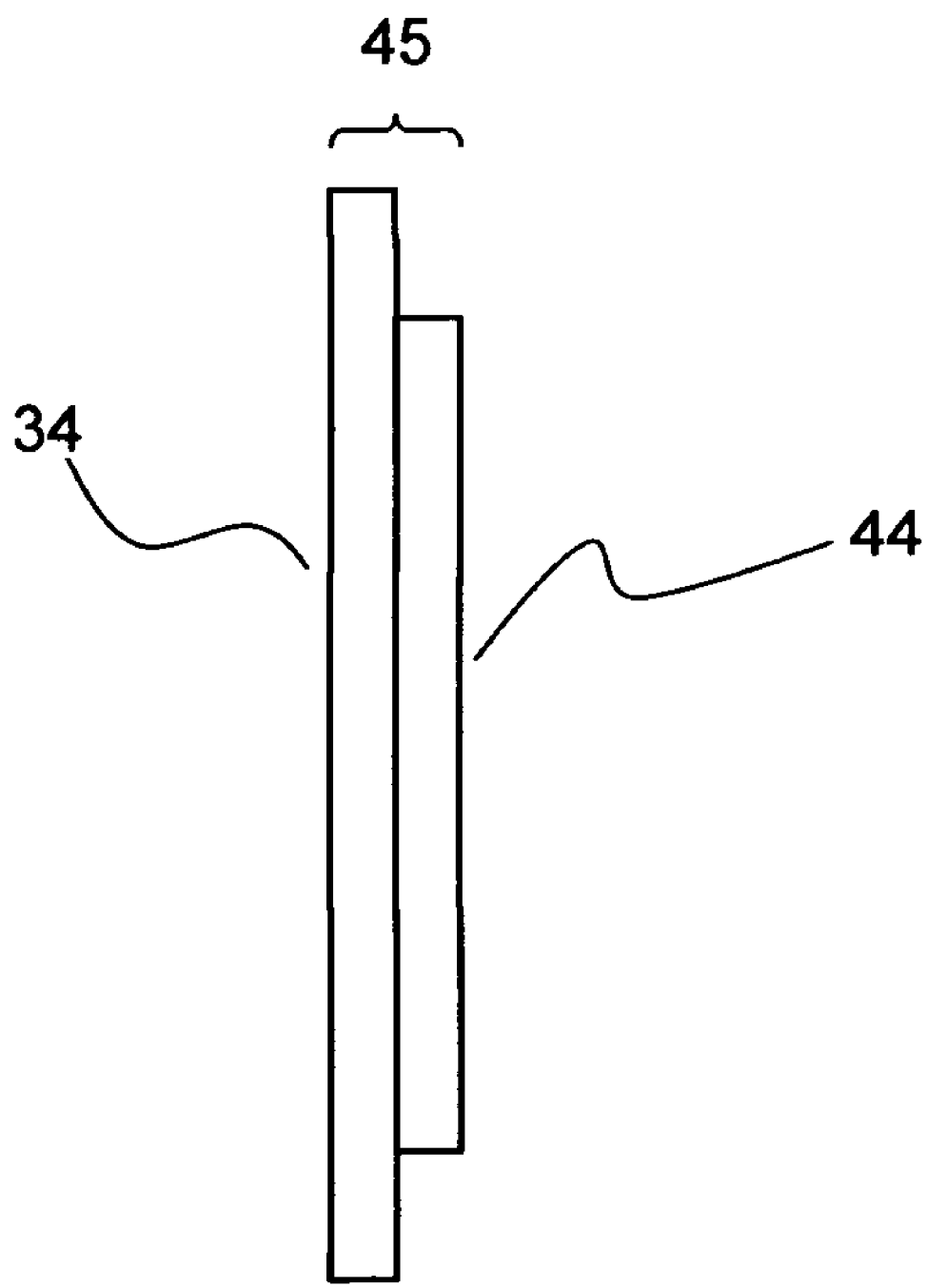
FIG. 16 is side elevation view of a bending element wherein an ultra-high expansion polymer is attached to a low-expansion dielectric.

Referring now to FIG. 16, the high expansion layer 33 within a bi-layer cantilever 45 may be replaced by an ultra-high expansion layer 44 comprised of a polymer, having a coefficient of thermal expansion greater than approximately $5\times10^{-5}$ K$^{-1}$. Exemplary ultra-high expansion polymers include, but are not limited to, styrene, acrylonitrile, pentafluorostyrene, methylmethacrylate, methacrylonitrile, benzonitrile, trimethylsilylacetylene, and trimethylsilylacetonitrile. The ultra-high expansion layer 44 contacts and is joined to a low expansion layer 34 composed of materials known within the art.

Figure 17:
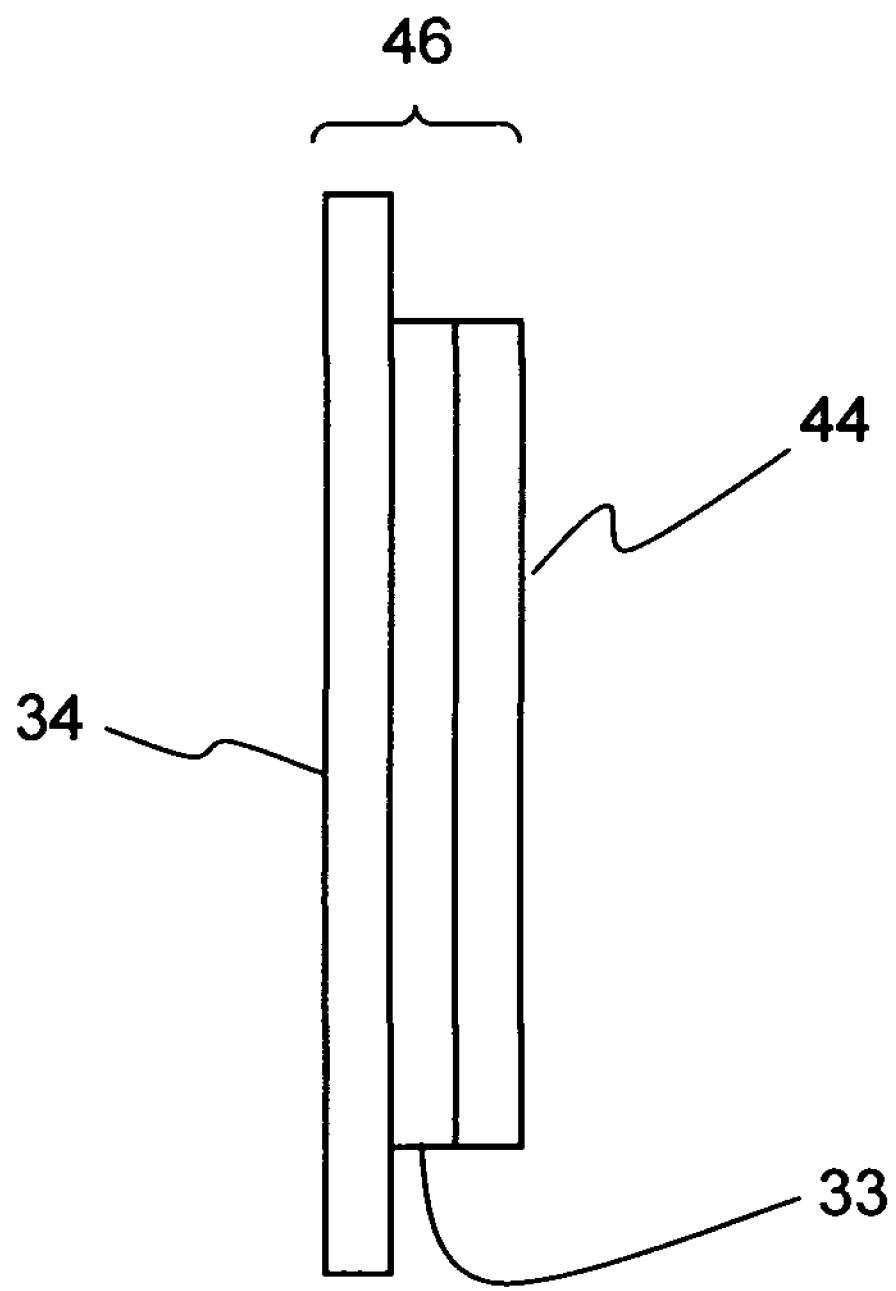
FIG. 17 is a side elevation view of a bending element wherein an ultra-high expansion polymer is attached to a high-expansion metal which is thereafter attached to a low expansion dielectric.
Figure 18:
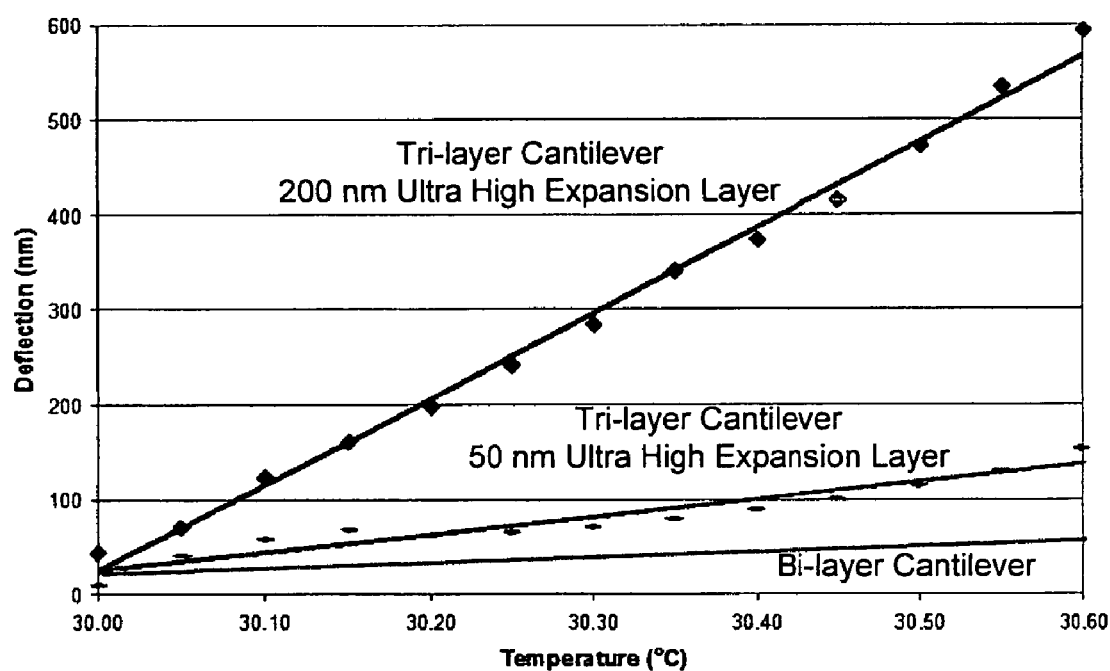
FIG. 18 is an exemplary deflection-temperature plot for a bi-layered cantilever without and with a polymer coating.

Referring now to FIG. 17, the ultra-high expansion layer 44 may be directly joined to the high expansion layer 33 opposite of the low expansion layer 34 to form a tri-layer cantilever 46. FIG. 18 compares the deflection achieved by an exemplary bi-layer cantilever 10a, 10b, 11a, 11b and a tri-layer cantilever 46.

Figure 19A:
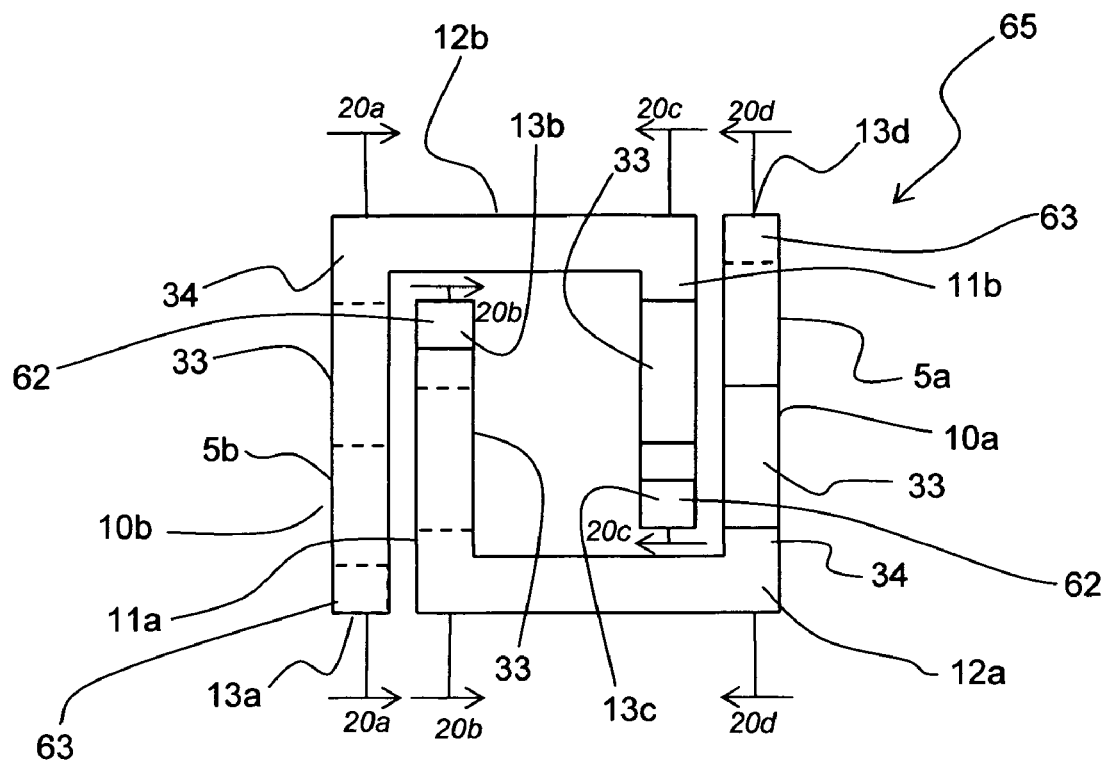
FIG. 19a is top elevation view of an alternate embodiment of the present invention including a pair of interlocking bending elements, wherein sensing element and substrate are not shown.

Referring now to FIGS. 19a, 19b, and 20a-20d, a micromechanical device 65 is shown including a pair of u-shaped bending elements 5a, 5b which are oppositely disposed and interlocking. The first bending element 5a includes a pair of bi-layer cantilevers 10a, 11a separated by a thermal isolation region 12a. The right bi-layer cantilever 10a includes a high expansion layer 33 disposed along the upper surface of a low expansion layer 34 and the left bi-layer cantilever 11a includes a high expansion layer 33 disposed along the lower or opposing surface of the low expansion layer 34. The second bending element 5b includes a pair of bi-layer cantilevers 10b, 11b separated by a thermal isolation region 12b. The left bi-layer cantilever 10b includes a high expansion layer 33 disposed along the lower surface of a low expansion layer 34 and the left bi-layer cantilever 11b includes a high expansion layer 33 disposed along the upper surface of the low expansion layer 34. When interlocked in an opposing fashion, the high expansion layers 33 are disposed along the same surface of the bi-layer cantilevers 10b and 11a and bi-layer cantilevers 10a and 11b. In some embodiments, the paired arrangement of high expansion layers 33 may be oppositely disposed, as shown in FIG. 19a, or on the same side as in FIG. 2.

Figure 19B:
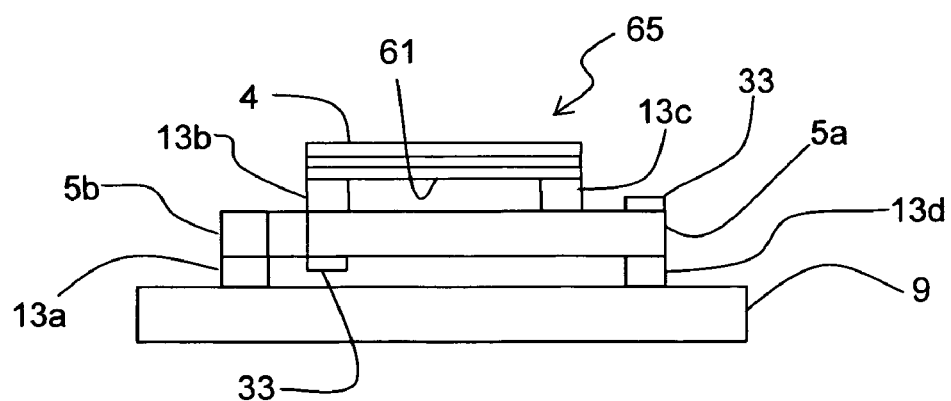
FIG. 19b is a front elevation view of a micromechanical device showing the interlocking elements in FIG. 19a disposed between a sensing element and substrate.
Figure 20A:
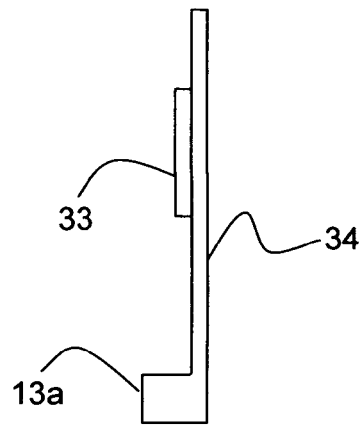
FIGS. 20a-20d are sectional views from the device in FIG. 19a showing arrangement of high and low thermal expansion layers.
Figure 20B:
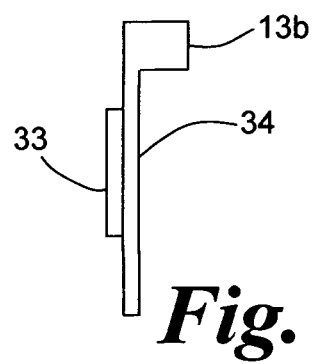
Figure 20C:
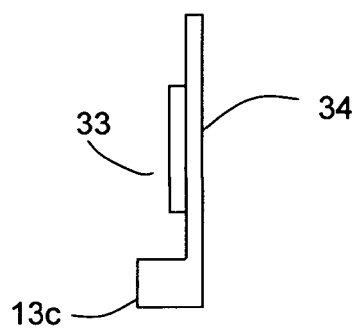
Figure 20D:
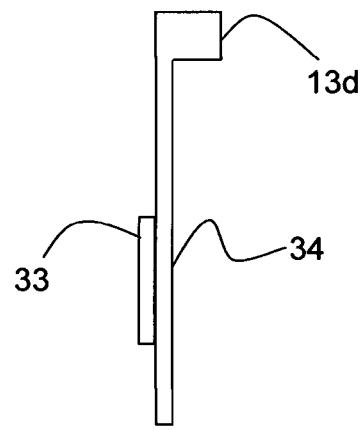
Figure 21A:
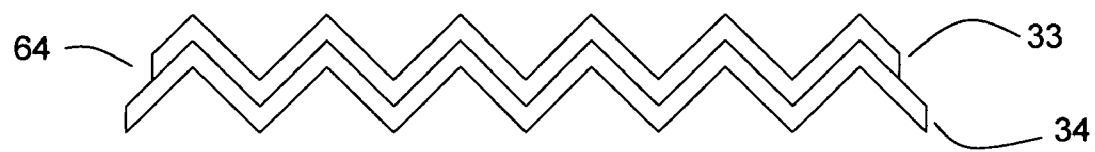
FIGS. 21a-21d are sectional views of alternate embodiments of the bi-layer cantilever showing various non-planar structures.
Figure 21B:
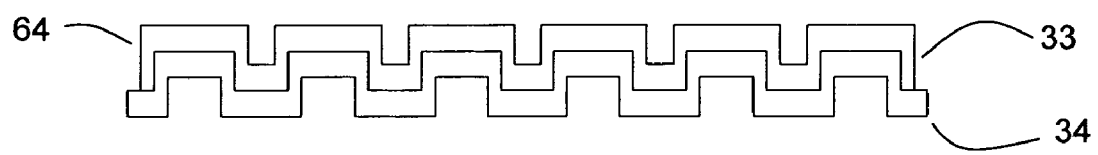
Figure 21C:
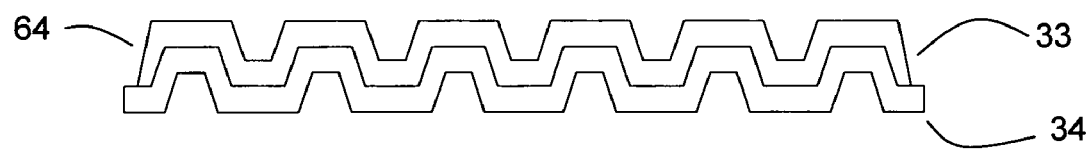
Figure 21D:
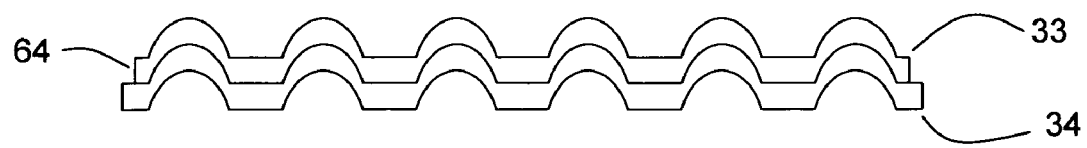

The outermost bi-layer cantilevers 10a, 10b are attached at their outermost end 63 to the substrate 9 via anchor posts 13d, 13a, respectively. The inner most bi-layer cantilevers 11a, 11b are attached at their innermost end 62 to the planar surface 61 of the sensing element 4 via anchor posts 13b, 13c, respectively. While a variety of arrangements are possible for the sensing element 4, bi-layer cantilevers 10a, 10b, 11a, 11b, and substrate 9, it is preferred for the bi-layer cantilevers 10a, 10b, 11a, 11b to be disposed between the sensing element 4 and substrate 9, as shown in FIG. 19b. The responsivity of the present embodiment is 3 to 6 times greater than that of a typical micromechanical pixel 3 shown in FIG. 2. The sensing elements 4 and substrates 9 described herein are applicable to this embodiment.

Referring now to FIGS. 21a-21d, a variety of non-planar cantilevers, referred to as folded bi-layer cantilevers 64, are described. Profiles may include, but are not limited to, triangular, square, trapezoidal, and curved, as shown in FIGS. 21a-21d, respectively. Folding is provided along the length (L) of the otherwise planar high expansion layer 33 and low expansion layer 34 comprising the bi-layer cantilevers 10a, 10b, 11a, 11b, 45, 46 described in FIGS. 4, 12, and 16. Folding increases the effective length of the bi-layer cantilever 10a, 10b, 11a, 11b, 45, 46 without increasing the lateral length and pitch of a micromechanical device 65. Folded bi-layer cantilevers 64 may be formed by three-dimensional patterning via standard micromechanical fabrication techniques.

From the foregoing description, one skilled in the art can easily ascertain the essential characteristics of this invention, and without departing from the spirit and scope thereof, can make various changes and modifications of the invention to adapt it to various usages and conditions.

The description above indicates that a great degree of flexibility is offered in terms of the invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A micromechanical pixel comprising:
   (a) a sensing element including an optical reflector and an infrared absorber layer disposed in a layered and contacting arrangement or separated by the distance equal to approximately one-quarter or multiple thereof of an infrared wavelength of interest so as to form an optical absorption cavity, said reflector layer comprised of a single metal layer or a pair of metal layers disposed about and contacting a dielectric layer;
   (b) a pair of bending elements each attached at a first end to said sensing element, each said bending element composed of two multi-layer cantilevers separated by a thermal isolation region, each said multi-layer cantilever comprised of a low expansion layer and a high expansion layer, said bending elements mutually responsive when heated; and
   (c) a substrate comprised of a material that is transmissive to the visible or near-infrared optical readout wavelength, a second end of each said bending element attached to said substrate.

2. The micromechanical pixel of claim 1, further comprising:
   (d) a partially absorbing layer which contacts said infrared absorber layer, said partially absorbing layer comprised of a metal.

3. The micromechanical pixel of claim 1, wherein said sensing element and said substrate are separated by the distance equal to approximately one-quarter or multiple thereof of said infrared wavelength so as to form, said optical absorption cavity.

4. The micromechanical pixel of claim 1, wherein said sensing element further includes a partially absorbing layer in a layered and contacting arrangement with said infrared absorber layer, said sensing element and said substrate are separated by the distance equal to approximately one-quarter or multiple thereof of said infrared wavelength of interest so as to form said optical absorption cavity.

5. The micromechanical pixel of claim 1, wherein said high expansion layer in each said multi-layer cantilever is comprised of a polymer.

6. The micromechanical pixel of claim 1, wherein each said multi-layer cantilever has a polymer, layer disposed along said high expansion layer opposite of said low expansion layer.

7. The micromechanical pixel of claim 1, wherein each said multi-layer cantilever has a non-planar profile disposed along the length thereof.

8. The micromechanical pixel of claim 1, further comprising:
(d) an anti-reflection coating comprised of at least one material transmissive of the optical readout wavelength along at least one surface of said substrate.

9. A micromechanical pixel comprising:
(a) a sensing element comprised of an absorbing layer contacting and attached to a first conductive layer;
(b) a pair of bending elements each attached at a first end to said sensing element, each said bending element comprised of two multi-layer cantilevers separated by a thermal isolation region, each said multi-layer cantilever comprised of a low expansion layer and a high expansion layer, said bending elements mutually responsive when heated;
(c) a substrate, a second end of each said bending element attached to said substrate, said sensing element and said substrate separated by a distance equal to approximately one-quarter or multiple thereof of an infrared wavelength of interest so as to form an optical absorption cavity; and
(d) a capacitive sensor with readout circuit contacting and attached to said substrate, said capacitive sensor having a second conductive layer, said first conductive layer and said second conductive layer forming a parallel plate capacitor within said micromechanical pixel, a second end of each bending element attached to said substrate, each said bending elements having a conductive layer with low thermal conductance thereon to electrically connect said sensing element to said capacitive sensor.

10. The micromechanical pixel of claim 9, further comprising:
(e) a partially absorbing layer which contacts said absorber layer, said partially absorbing layer comprised of a metal.

11. The micromechanical pixel of claim 9, wherein said high expansion layer in each said multi-layer cantilever is comprised of a polymer.

12. The micromechanical pixel of claim 9, wherein each said multi-layer cantilever has a polymer layer disposed along said high expansion layer opposite of said low expansion layer.

13. The micromechanical pixel of claim 9, wherein each said multi-layer cantilever has a non-planar profile disposed along the length thereof.

* * * * *